US011289096B2

(12) United States Patent
Taubman et al.

(10) Patent No.: US 11,289,096 B2
(45) Date of Patent: *Mar. 29, 2022

(54) PROVIDING ANSWERS TO VOICE QUERIES USING USER FEEDBACK

(71) Applicant: Google LLC, Mountain View, CA (US)

(72) Inventors: Gabriel Taubman, Brooklyn, NY (US); Andrew W. Hogue, Ho Ho Kus, NJ (US); John J. Lee, Long Island City, NY (US)

(73) Assignee: Google LLC, Mountain View, CA (US)

(*) Notice: Subject to any disclaimer, the term of this patent is extended or adjusted under 35 U.S.C. 154(b) by 200 days.

This patent is subject to a terminal disclaimer.

(21) Appl. No.: 16/686,034

(22) Filed: Nov. 15, 2019

(65) Prior Publication Data

US 2020/0082829 A1    Mar. 12, 2020

Related U.S. Application Data

(63) Continuation of application No. 15/606,373, filed on May 26, 2017, now Pat. No. 10,504,521, which is a
(Continued)

(51) Int. Cl.
*G06F 16/33* (2019.01)
*G06F 16/9535* (2019.01)
(Continued)

(52) U.S. Cl.
CPC .......... *G10L 15/30* (2013.01); *G06F 16/9535* (2019.01); *G10L 15/22* (2013.01);
(Continued)

(58) Field of Classification Search
CPC . G06F 16/3331; G06F 16/9535; G10L 15/22; G10L 15/30
See application file for complete search history.

(56) References Cited

U.S. PATENT DOCUMENTS 5,685,000 A * 11/1997 Cox, Jr. ................. G10L 15/22
704/9
6,173,266 B1    1/2001  Marx et al.
(Continued)

OTHER PUBLICATIONS

Ingrid Lunden, "Another Siri-Like App, Voice Answer, Hits the App Store For Those of us Without The iPhones 4S," TechCmnch, Retrieved from <http://techcmnch.com/2012/04/18/another-siri-like-app-voice-answer-hits-the-app-store-for-thoseof-us-without-the-iphone-4s/>, Apr. 18, 2012.
(Continued)

*Primary Examiner* — Daniel C Washburn
*Assistant Examiner* — Oluwadamilola M Ogunbiyi
(74) *Attorney, Agent, or Firm* — Honigman LLP; Brett A. Krueger; Grant Griffith

(57) ABSTRACT

Methods, systems, and apparatus, including computer programs encoded on a computer storage medium, for training a dialog system using user feedback. According to one implementation, a method includes receiving, by a dialog engine and from a computing device, a voice input; determining, by the dialog engine, that the received voice input is classified as feedback to an answer of a question; identifying, by the dialog engine, a predetermined feedback score associated with the feedback; and adjusting a confidence score associated with the question and the answer based on the predetermined feedback score.

20 Claims, 24 Drawing Sheets

Related U.S. Application Data continuation of application No. 13/668,603, filed on Nov. 5, 2012, now Pat. No. 9,679,568.

(60) Provisional application No. 61/654,512, filed on Jun. 1, 2012, provisional application No. 61/654,746, filed on Jun. 1, 2012, provisional application No. 61/654,437, filed on Jun. 1, 2012, provisional application No. 61/654,518, filed on Jun. 1, 2012.

(51) Int. Cl.
  *G10L 15/22* (2006.01)
  *G10L 15/30* (2013.01)
  *H04M 3/493* (2006.01)

(52) U.S. Cl.
  CPC ........ *G06F 16/3337* (2019.01); *H04M 3/493* (2013.01); *H04M 3/4938* (2013.01)

(56) References Cited

U.S. PATENT DOCUMENTS

| | | | |
|---|---|---|---|
| 6,829,599 B2 | 12/2004 | Chidlovskii | |
| 7,024,366 B1 | 4/2006 | Deyoe et al. | |
| 7,139,717 B1 | 11/2006 | Abella et al. | |
| 7,197,460 B1 | 3/2007 | Gupta et al. | |
| 7,249,011 B2 | 7/2007 | Chou et al. | |
| 7,363,282 B2* | 4/2008 | Karnawat | G06F 16/9535 706/45 |
| 7,418,391 B2 | 8/2008 | Gayama et al. | |
| 7,451,089 B1 | 11/2008 | Gupta et al. | |
| 7,587,324 B2 | 9/2009 | Kaiser | |
| 7,702,508 B2 | 4/2010 | Bennett | |
| 7,734,471 B2 | 6/2010 | Paek et al. | |
| 7,869,998 B1 | 1/2011 | Di Fabbrizio et al. | |
| 7,933,775 B2 | 4/2011 | Quibria et al. | |
| 8,032,481 B2 | 10/2011 | Pinckney et al. | |
| 8,090,680 B2* | 1/2012 | Smeaton | G06F 16/9535 707/608 |
| 8,117,197 B1 | 2/2012 | Cramer | |
| 8,126,719 B1 | 2/2012 | Jochumson | |
| 8,160,883 B2 | 4/2012 | Lecoeuche | |
| 8,185,539 B1 | 5/2012 | Bhardwaj | |
| 8,214,214 B2 | 7/2012 | Bennett | |
| 8,265,939 B2 | 9/2012 | Kanevsky et al. | |
| 8,280,888 B1 | 10/2012 | Bierner et al. | |
| 8,296,144 B2 | 10/2012 | Weng et al. | |
| 8,473,299 B2 | 6/2013 | Di Fabbrizio et al. | |
| 8,611,876 B2 | 12/2013 | Miller | |
| 8,612,223 B2 | 12/2013 | Minamino et al. | |
| 8,725,512 B2 | 5/2014 | Claiborn et al. | |
| 8,825,482 B2 | 9/2014 | Hernandez-Abrego et al. | |
| 9,123,338 B1 | 9/2015 | Sanders et al. | |
| 9,405,363 B2 | 8/2016 | Hernandez-Abrego et al. | |
| 9,812,123 B1 | 11/2017 | Sanders et al. | |
| 2001/0021909 A1 | 9/2001 | Shimomura et al. | |
| 2002/0069058 A1 | 6/2002 | Jin et al. | |
| 2002/0198707 A1 | 12/2002 | Zhou | |
| 2005/0027670 A1* | 2/2005 | Petropoulos | G06F 16/9535 |
| 2005/0091056 A1 | 4/2005 | Surace et al. | |
| 2006/0122837 A1 | 6/2006 | Kim et al. | |
| 2006/0149544 A1 | 7/2006 | Hakkani-Tur et al. | |
| 2006/0190809 A1 | 8/2006 | Hejna | |
| 2006/0248057 A1 | 11/2006 | Jacobs et al. | |
| 2007/0003914 A1* | 1/2007 | Yang | G06F 9/453 434/236 |
| 2007/0043571 A1 | 2/2007 | Michelini et al. | |
| 2007/0061142 A1 | 3/2007 | Hernandez-Abrego et al. | |
| 2007/0136246 A1* | 6/2007 | Stenchikova | G06F 16/951 |
| 2007/0192095 A1 | 8/2007 | Braho et al. | |
| 2008/0133245 A1 | 6/2008 | Proulx et al. | |
| 2008/0154828 A1* | 6/2008 | Antebi | G06F 16/2462 706/46 |
| 2009/0070113 A1 | 3/2009 | Gupta et al. | |
| 2010/0104087 A1 | 4/2010 | Byrd et al. | |
| 2010/0125456 A1 | 5/2010 | Weng et al. | |
| 2011/0015928 A1 | 1/2011 | Odell et al. | |
| 2012/0041950 A1 | 2/2012 | Koll et al. | |
| 2012/0059815 A1* | 3/2012 | Friedlander | G06F 16/9535 707/709 |
| 2012/0063620 A1 | 3/2012 | Nomura et al. | |
| 2012/0136667 A1 | 5/2012 | Emerick et al. | |
| 2013/0063550 A1* | 3/2013 | Ritchey | G06F 3/015 348/36 |
| 2013/0086029 A1 | 4/2013 | Hebert | |
| 2013/0304758 A1* | 11/2013 | Gruber | G06F 16/248 707/769 |
| 2014/0229866 A1 | 8/2014 | Gottlieb | |
| 2015/0066479 A1* | 3/2015 | Pasupalak | G06F 40/40 704/9 |

OTHER PUBLICATIONS

Qiaoling et al, "Predicting Web Searcher Satisfaction with Existing Community-based Answers," Proceedings of the 34th international ACM SIGIR conference on Research and development in Information Retrieval. ACM, 2011.

Youtube video uploader—sparklingapps, "Voice Answer: a 'Siri like application for All iPhones and iPads", Uploaded Jan. 20, 2012, Yotube Published Video link <https://youtu.be/zNufnccFIRc>.

* cited by examiner

600 ⟶

| Feedback | Feedback score |
|---|---|
| Awesome thanks | 1.0 |
| Great answer | 1.0 |
| Maybe | 0.5 |
| I guess | 0.5 |
| That might not be right | 0.2 |
| That's wrong | 0.0 |
| Wrong answer | 0.0 |
| ... | ... |

| | Question | Answer | Q-AP score |
|---|---|---|---|
| 705 | | | |
| 710 | Who invented the telephone | Alexander Graham Bell | 0.9 |
| 715 | Who invented the telephone | Marty McFly | 0.1 |
| 720 | What color is grass | Green | 1.0 |
| 725 | What is the American national anthem | Star-Spangled Banner | 0.8 |
| 730 | What is the American national anthem | Oh Say Can You See | 0.1 |
| 735 | What is the best Canadian band | Rush | 0.8 |
| | Who is the best band from Canada | Nickelback | 0.0 |
| | ... | ... | ... |

FIG. 7

PROVIDING ANSWERS TO VOICE QUERIES USING USER FEEDBACK

CROSS REFERENCE TO RELATED APPLICATIONS

This U.S. patent application is a continuation of, and claims priority under 35 U.S.C. § 120 from, U.S. patent application Ser. No. 15/606,373, filed on May 26, 2017, which is a continuation of U.S. patent application Ser. No. 13/668,603, filed on Nov. 5, 2012, which claims priority under 35 U.S.C. § 119(e) to U.S. Provisional Application 61/654,512, filed on Jun. 1, 2012, U.S. Provisional Application 61/654,437, filed on Jun. 1, 2012, U.S. Provisional Application 61/654,746, filed on Jun. 1, 2012, and U.S. Provisional Application 61/654,518, filed on Jun. 1, 2012. The disclosures of these prior applications are considered part of the disclosure of this application and are hereby incorporated by reference in their entireties.

BACKGROUND

This specification generally relates to dialog systems, and one particular implementation relates to determining that an input from a user is feedback to a previously provided answer.

SUMMARY

According to one innovative aspect of the subject matter described in this specification, an input that is received from a user of a dialog system after a question-answer interaction between the user and the dialog system is evaluated to determine whether the input is feedback to the answer previously provided by the dialog system. If the input is determined as feedback, the dialog system may classify the input as positive or negative feedback to the answer. If the dialog system classifies the input as negative feedback, the dialog system may provide an alternative answer to the question.

According to another innovative aspect of the subject matter described in this specification, a method includes receiving a voice input. The method also includes determining that the received voice input is classified as feedback to an answer of a question, identifying a predetermined feedback score associated with the feedback, and adjusting a confidence score associated with the question and the answer based on the predetermined feedback score.

Other implementations of this aspect include corresponding systems, apparatus, and computer programs, configured to perform the actions of the methods, encoded on computer storage devices.

These and other implementations can each optionally include one or more of the following features. For instance, the method includes determining that the voice input is classified as feedback to the answer, then determining a feedback score associated with the voice input; the method includes before receiving the voice input representing the feedback to the answer, receiving, from the computing device, an additional voice input that specifies the question, and providing, to the computing device, the answer to the question; the method includes normalizing the feedback, and identifying the predetermined feedback score based on the normalized feedback; the method includes determining the predetermined feedback score is lower than a threshold, and classifying the feedback as negative feedback, where the confidence score is adjusted lower based on classifying the feedback as negative feedback; the method includes after adjusting the confidence score, identifying a second answer to the question, where a confidence score associated with the question and the second answer is higher than the adjusted confidence score associated with the question and the answer, and providing, to the computing device, the second answer; the method includes determining the predetermined feedback score is higher than a threshold, and classifying the feedback as positive feedback, where the confidence score is adjusted higher based on classifying the feedback as positive feedback; the method includes receiving, from a different computing device, a second voice input, determining that the second voice input is classified as feedback to the answer, identifying a second predetermined feedback score associated with the feedback from the different computing device, and adjusting the confidence score associated with the question and the answer based on the feedback from the computing device and the feedback from the different computing device; the method includes determining that the voice input is classified as feedback by determining that a time difference between a time associated with providing the answer and a time associated with receiving the voice input is within a predetermined time; the method includes determining that the voice input is classified as feedback by determining that the voice input is received after providing the answer to the question; the method includes determining that the voice input is classified as feedback by determining that the voice input is semantically similar to the question; the method includes determining that the voice input is classified as feedback by identifying an action associated with the voice input; the method includes identifying the action as calling a telephone number associated with the answer, or sending an email to an email address associated with the answer.

Advantageous implementations may include one or more of the following features. By identifying feedback associated with an answer, a system may gauge a user's likely attitude toward an answer—e.g., satisfaction, dissatisfaction, or ambivalence. The system may use this feedback to improve its question-answering capability—e.g., may allow the system to dynamically improve answers provided to questions—thus improving users' experience. The system may provide a follow-up answer when a user's feedback indicates dissatisfaction with an answer to improve a user's experience.

The details of one or more implementations are set forth in the accompanying drawings and the description below. Other potential features and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations.

FIG. 6 illustrates an example data structure that may be stored by a feedback score repository, according to one or more implementations described herein;

FIG. 7 illustrates an example data structure that may be stored by a question-answer score repository, according to one or more implementations described herein;

In the drawings, like reference numbers represent corresponding parts throughout.

DETAILED DESCRIPTION

Devices implementing a dialog system may store information that indicates the strength of an answer when provided in response to a particular question. In other words, such devices may store confidence scores for question-answer pairs. A particular confidence score may indicate a relevance of a particular answer to a particular question.

A system and/or method, described herein, may enable one or more devices to generate or modify question-answer pair scores based on user feedback, such as feedback that a user provides after a user device outputs an answer that responds to the user's question. In some implementations, the user device may provide a follow-up answer after a user responds in a way that is characterized as dissatisfaction with an original answer.

Figure 1A:
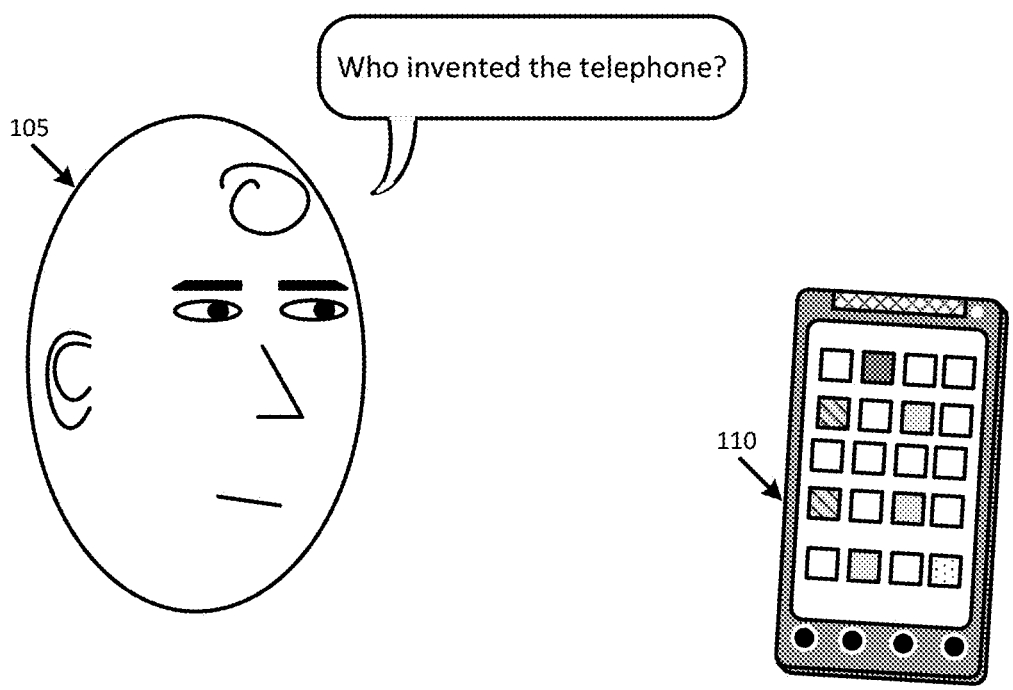
FIGS. 1A-2E illustrate an overview of example implementations described herein.
Figure 1B:
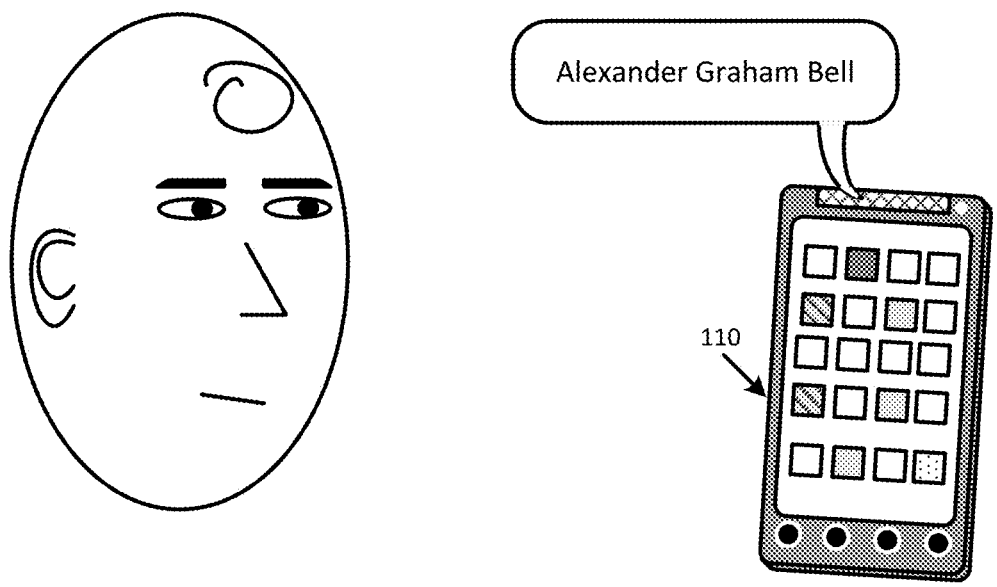
Figure 1C:
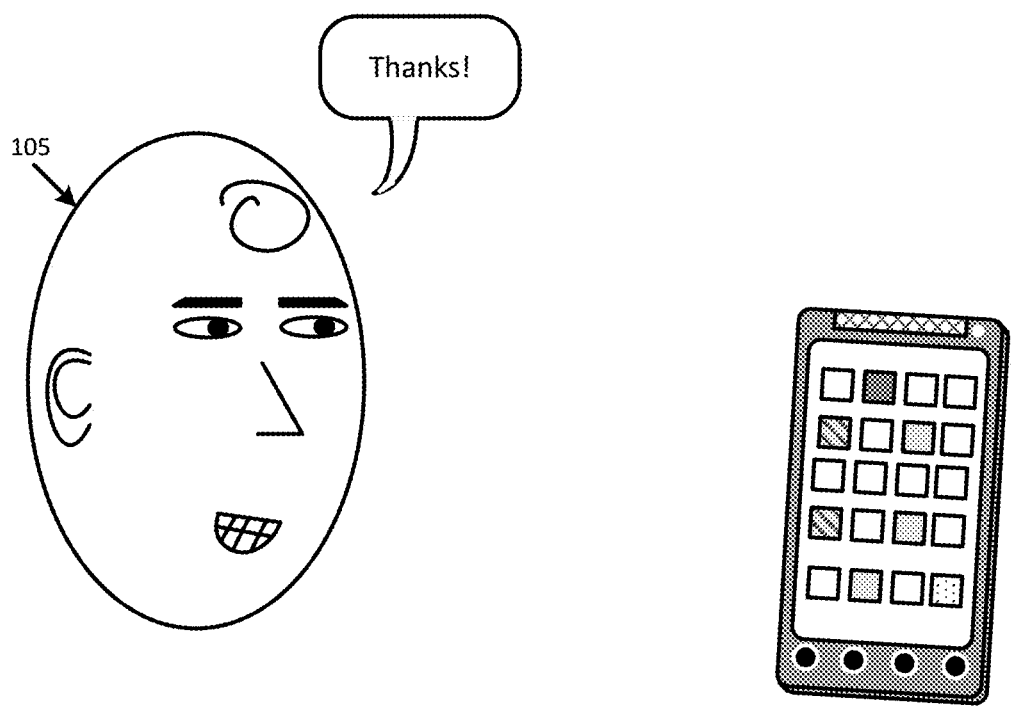
Figure 1D:
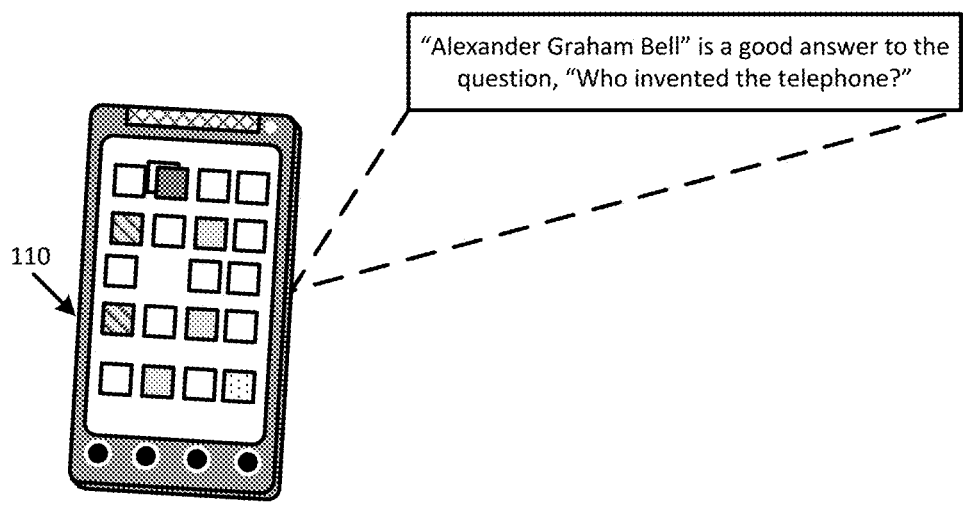

FIGS. 1A-2E illustrate an overview of example implementations described herein. For example, as shown in FIG. 1A, a user 105 may ask a question, "Who invented the telephone?" to a user device 110. As shown in FIG. 1B, the user device 110 may answer "Alexander Graham Bell." As shown in FIG. 1C, the user 105 may provide feedback, such as speaking the word "Thanks." Based on this feedback being characterized as positive feedback, and as shown in FIG. 1D, the user device 110 may store information indicating that the answer "Alexander Graham Bell" is a good answer to the question "Who invented the telephone?"

Figure 2A:
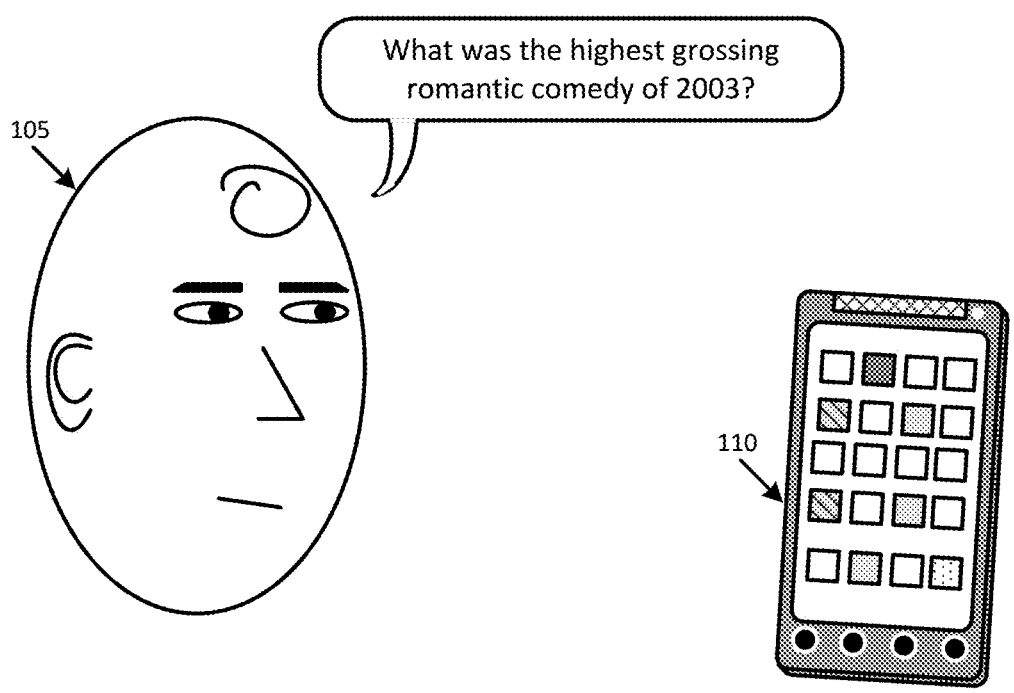
Figure 2B:
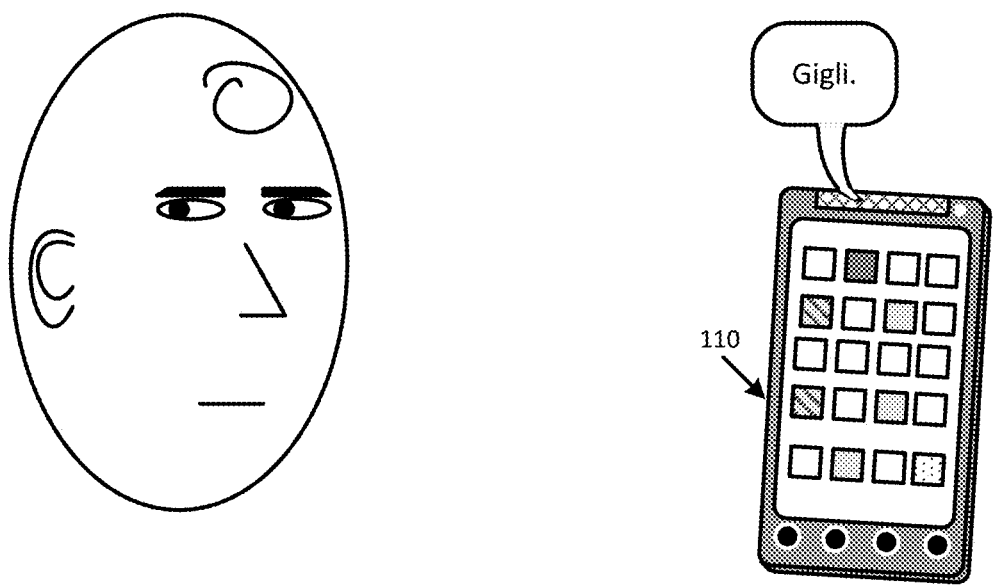
Figure 2C:
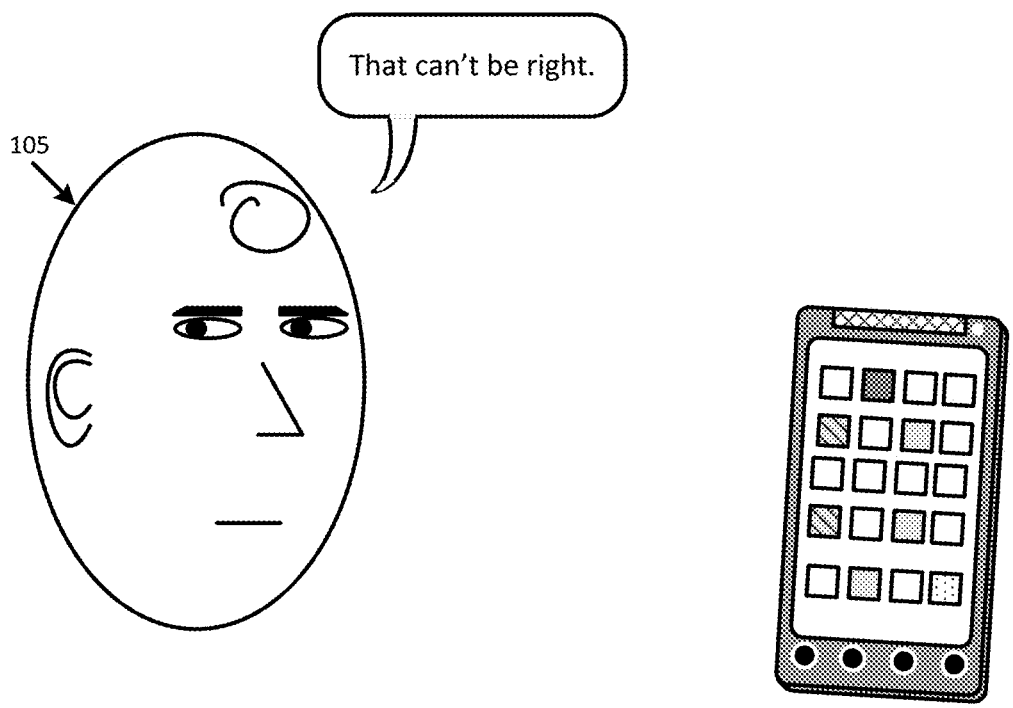
Figure 2D:
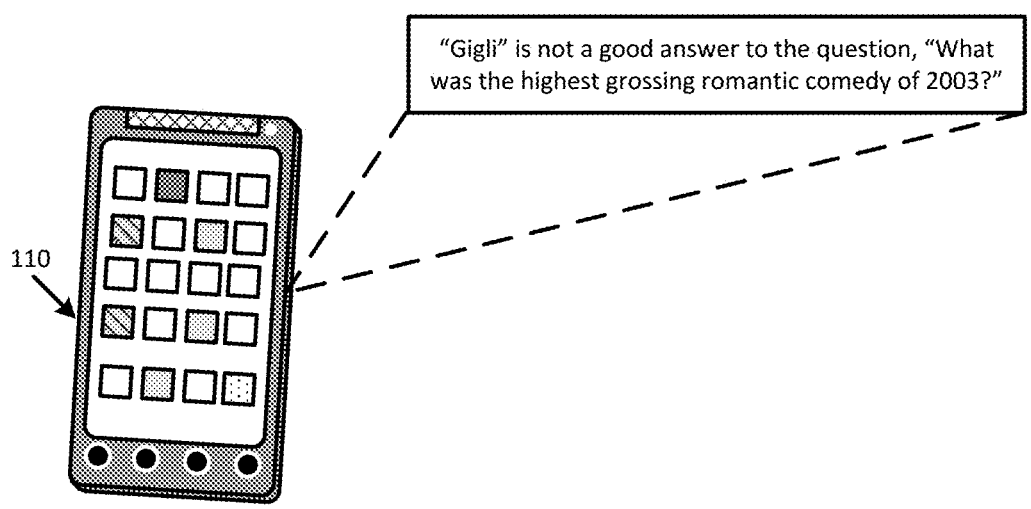
Figure 2E:
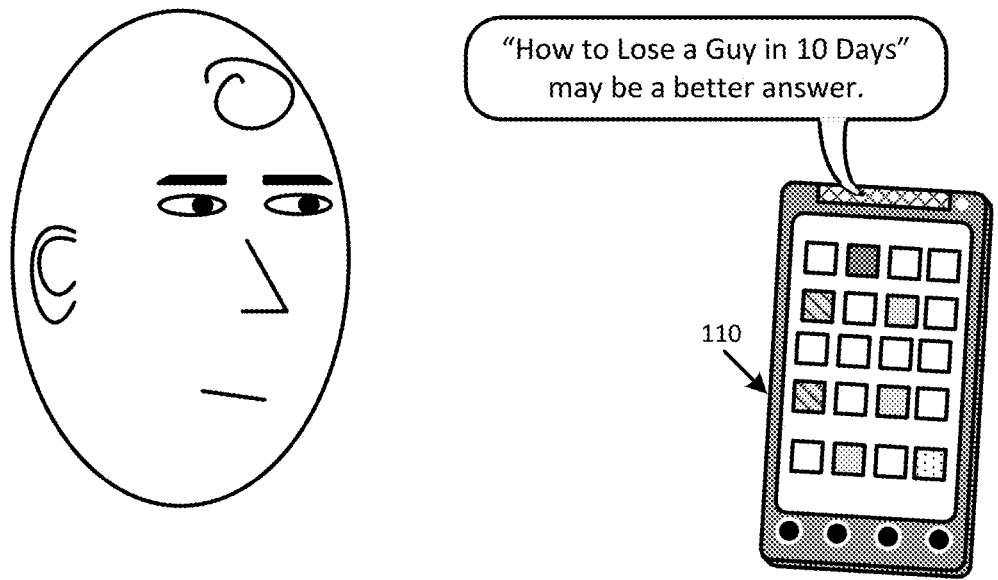

FIG. 2A illustrates a user 105 asking a question "What was the highest grossing romantic comedy of 2003?" to a user device 110. As shown in FIG. 2B, the user device 110 may answer "Gigli." As shown in FIG. 2C, the user 105 may provide feedback, such as speaking the phrase "That can't be right." Based on this feedback being characterized as negative feedback, and as shown in FIG. 2D, the user device 110 may store information indicating that the answer "Gigli" is not a good answer to the question "What was the highest grossing romantic comedy of 2003?" As shown in FIG. 2E, the user device 110 may provide a follow-up answer, "How to Lose a Guy in 10 Days' may be a better answer." This follow-up answer may include an alternative answer—i.e., "How to Lose a Guy in 10 Days" in this example—that is more accurate than the answer provided in FIG. 2B, with which the user 105 expressed his dissatisfaction in FIG. 2C. Furthermore, the follow-up answer may include an indication that the answer is a follow-up to the answer provided in FIG. 2B by, for example, including the phrase "may be a better answer."

Figure 3:
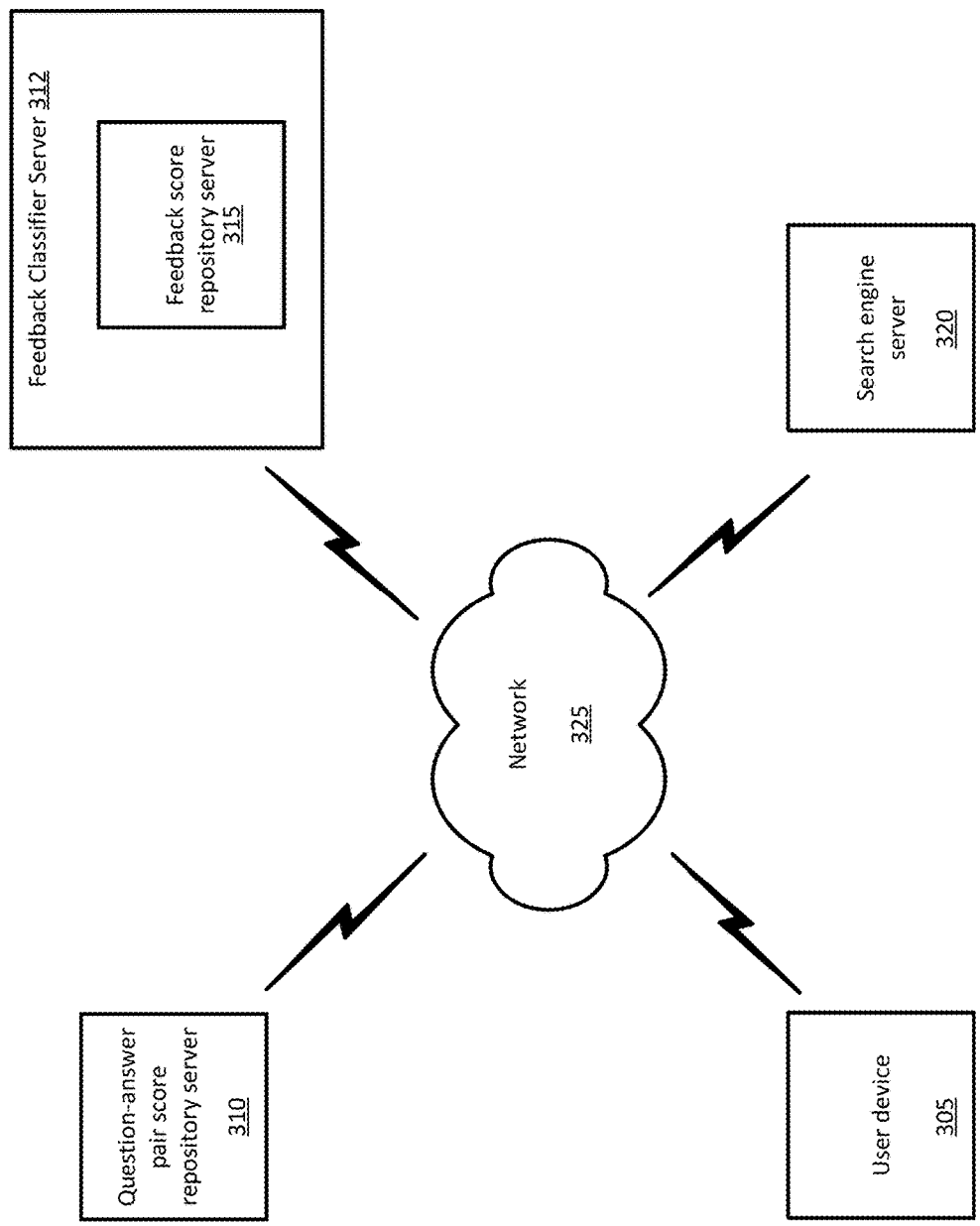
FIG. 3 illustrates an example environment in which systems and/or methods described herein may be implemented.

FIG. 3 is a diagram of an example environment 300 in which systems and/or methods described herein may be implemented. Environment 300 may include a user device 305 and servers, such as a question-answer pair score repository server 310, a feedback classifier server 312 that may include a feedback score repository server 315, and a search engine server 320, herein collectively referred to as "servers 310-320," connected to a network 325. One user device 305 and servers 310-320 have been illustrated as connected to network 325 for simplicity. In practice, environment 300 may include additional user devices and/or servers or fewer user devices and/or servers. Also, in some instances, a user device may perform a function of a server, and a server may perform a function of a user device.

The user device 305 may include a client device, such as a mobile telephone, a personal computer, a personal digital assistant ("PDA"), a tablet computer, a laptop, or any other type of computation or communication device. The user device 305 may include audio input/output devices that allow a user to communicate with user device 305 via speech. For example, these audio input/output devices may include one or more microphones and/or one or more speakers. The user device 305 may also include one or more visual input/output devices, such as one or more cameras and/or one or more screens that are capable of presenting a user interface via which a user may interact.

Servers 310-320 may each be implemented as a single server device or a collection of server devices that may be co-located or remotely located. Additionally, or alternatively, two or more of servers 310-320 may be implemented within a single, common server device or a single, common collection of server devices.

The question-answer pair score repository server 310 may store information regarding confidence scores associated with question-answer pairs. As mentioned above, these confidence scores may each indicate a relevance of a particular answer to a particular question. In some implementations, the question-answer pair score repository server 310 may adjust a confidence score when a user is connected to one or more of the servers 310-320. In some implementations, the question-answer pair score repository server 310 may adjust a confidence score offline, where a user is not connected to the servers 310-320.

In general, the feedback classifier server 312 may classify a user's input as feedback to a particular answer previously provided to the user by the servers 310-320. In some implementations, the feedback classifier server may include a feedback score repository server 315 that stores information regarding feedback scores. As further described below, these scores may indicate how to interpret different types of feedback from users.

A search engine server 320 may implement a search engine that receives search queries, e.g., from the user device 305. These search queries may be based on questions received by the user device 305. The search engine server 320 may provide one or more results to the user device 305 in response to received search queries. As further described below, the user device 305 may use the one or more results when providing an answer to a received question.

Additional servers, implementing other functions, may also be implemented in environment 300. The additional servers may provide, for example, web content, payment services, shopping services, social networking services, etc.

Network 325 may include any type of network, such as a local area network ("LAN"), a wide area network ("WAN"), a telephone network—e.g., the Public Switched Telephone Network ("PSTN") or a cellular network—an intranet, the Internet, or a combination of networks. User device 305 and servers 310-320 may connect to network 325 via wired and/or wireless connections. In other words, user device 305 and/or any of servers 310-320 may connect to network 325 via a wired connection, a wireless connection, or a combination of a wired connection and a wireless connection.

Figure 4:
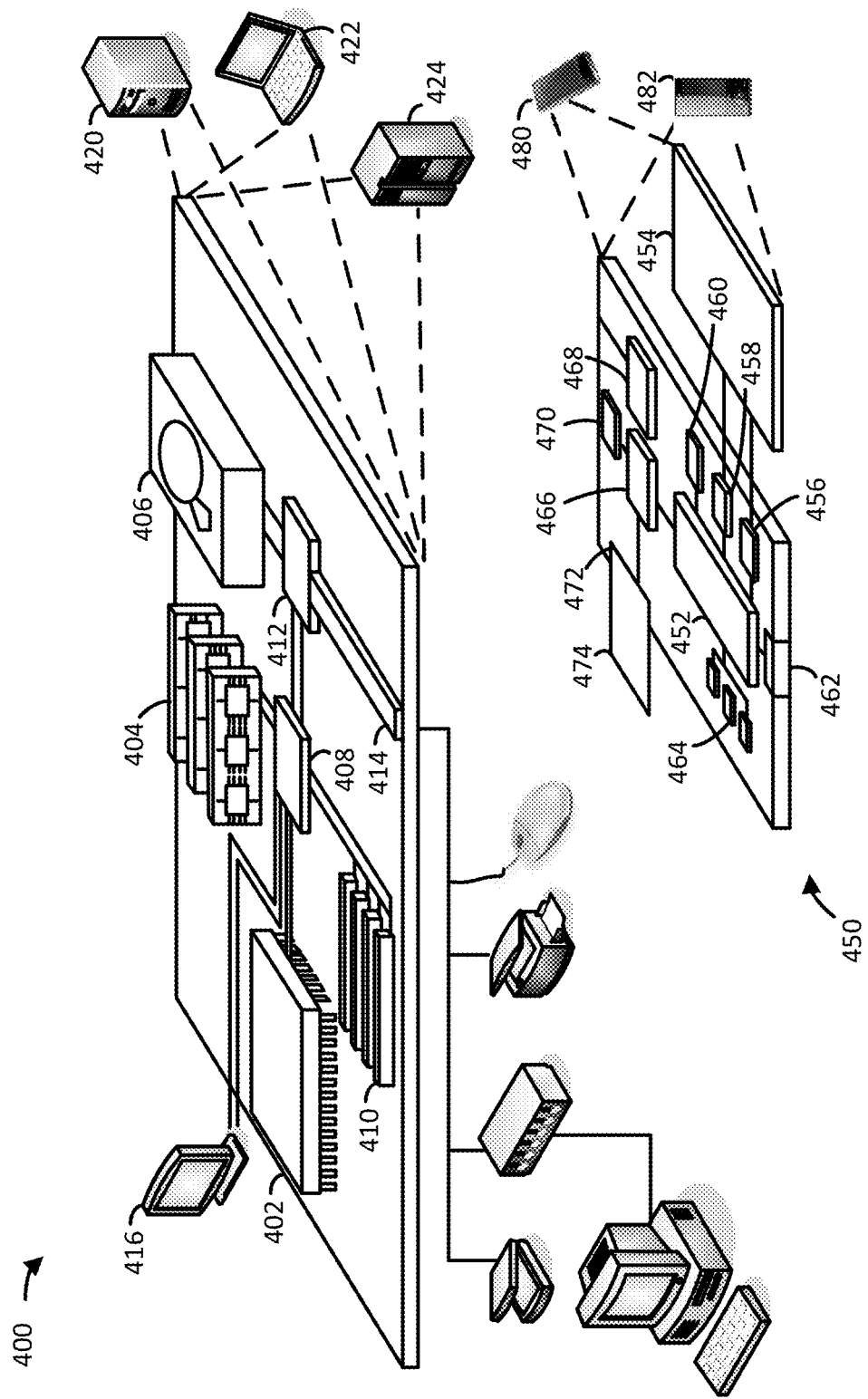
FIG. 4 shows an example of a generic computer device and a generic mobile computer device according to one or more implementations.

FIG. 4 shows an example of a generic computing device 400 and a generic mobile computing device 450, which may be used with the techniques described here. Computing device 400 and mobile computing device 450 may correspond to, for example, any of user device 305 and/or servers 310-320. Each of user device 305 and servers 310-320 may include one or more computing devices 400, mobile computing devices 450, or components of computing device 400 and/or mobile computing device 450.

Computing device 400 is intended to represent various forms of digital computers, such as laptops, desktops, workstations, personal digital assistants, servers, blade servers, mainframes, and other appropriate computers. Mobile computing device 450 is intended to represent various forms of mobile devices, such as personal digital assistants, cellular telephones, smart phones, and other similar computing devices. The components shown in FIG. 4, their connections and relationships, and their functions, are meant to be examples only, and are not meant to limit implementations described and/or claimed in this document.

Computing device 400 may include a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. Processor 402 can process instructions for execution within the computing device 400, including instructions stored in the memory 404 or on the storage device 406 to display graphical information for a graphical user interface ("GUI") on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system, etc.

Memory 404 stores information within the computing device 400. In some implementations, memory 404 includes a volatile memory unit or units. In some implementations, memory 404 includes a non-volatile memory unit or units. The memory 404 may also be another form of computer-readable medium, such as a magnetic or optical disk. A computer-readable medium may be defined as a non-transitory memory device. A memory device may include space within a single physical memory device or spread across multiple physical memory devices.

Storage device 406 is capable of providing mass storage for the computing device 400. In some implementations, storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 404, storage device 406, or memory on processor 402.

High speed controller 408 manages bandwidth-intensive operations for the computing device 400, while low speed controller 412 manages lower bandwidth-intensive operations. Such allocation of functions is exemplary only. In some implementations, high-speed controller 408 is coupled to memory 404, display 416, e.g., through a graphics processor or accelerator, and to high-speed expansion ports 410, which may accept various expansion cards (not shown). In this implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as mobile computing device 450. Each of such devices may contain one or more of computing devices 400, 450, and an entire system may be made up of multiple computing devices 400, 450 communicating with each other.

Mobile computing device 450 may include a processor 452, memory 464, an input/output ("I/O") device such as a display 454, a communication interface 466, and a transceiver 468, among other components. Mobile computing device 450 may also be provided with a storage device, such as a micro-drive or other device, to provide additional storage. Each of the components 450, 452, 464, 454, 466, and 468 are interconnected using various buses, and several of the components may be mounted on a common motherboard or in other manners as appropriate.

Processor 452 can execute instructions within mobile computing device 450, including instructions stored in memory 464. Processor 452 may be implemented as a chipset of chips that include separate and multiple analog and digital processors. Processor 452 may provide, for example, for coordination of the other components of mobile computing device 450, such as control of user interfaces, applications run by mobile computing device 450, and wireless communication by mobile computing device 450.

Processor 452 may communicate with a user through control interface 458 and display interface 456 coupled to a display 454. Display 454 may be, for example, a Thin-Film-Transistor Liquid Crystal Display ("TFT LCD") or an Organic Light Emitting Diode ("OLED") display, or other appropriate display technology. Display interface 456 may include appropriate circuitry for driving display 454 to present graphical and other information to a user. Control interface 458 may receive commands from a user and convert them for submission to the processor 452. In addition, an external interface 462 may be in communication with processor 452, so as to enable near area communication of mobile computing device 450 with other devices. External interface 462 may provide, for example, for wired communication in some implementations, or for wireless communication in other implementations, and multiple interfaces may also be used.

Memory 464 stores information within mobile computing device 450. Memory 464 can be implemented as one or more of a computer-readable medium or media, a volatile memory unit or units, or a non-volatile memory unit or units. Expansion memory 474 may also be provided and connected to mobile computing device 450 through expansion interface 472, which may include, for example, a Single In Line Memory Module ("SIMM") card interface. Such expansion memory 474 may provide extra storage space for device 450, or may also store applications or other information for mobile computing device 450. Specifically, expansion memory 474 may include instructions to carry out or supplement the processes described above, and may include secure information also. Thus, for example, expansion memory 474 may be provide as a security module for mobile computing device 450, and may be programmed with instructions that permit secure use of device 450. In addition, secure applications may be provided via the SIMM cards, along with additional information, such as placing identifying information on the SIMM card in a non-hackable manner.

Expansion memory 474 may include, for example, flash memory and/or NVRAM memory. In some implementations, a computer program product is tangibly embodied in an information carrier. The computer program product contains instructions that, when executed, perform one or more methods, such as those described above. The information carrier is a computer-or machine-readable medium, such as the memory 464, expansion memory 474, or memory on processor 452, that may be received, for example, over transceiver 468 or external interface 462.

Mobile computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver. In addition, Global Positioning System ("GPS") receiver module 470 may provide additional navigation- and location-related wireless data to mobile computing device 450, which may be used as appropriate by applications running on mobile computing device 450.

Mobile computing device 450 may also communicate audibly using audio codec 460, which may receive spoken information from a user and convert it to usable digital information. Audio codec 460 may likewise generate audible sound for a user, such as through a speaker, e.g., in a handset of mobile computing device 450. Such sound may include sound from voice telephone calls, may include recorded sound, e.g., voice messages, music files, etc., and may also include sound generated by applications operating on mobile computing device 450.

Mobile computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used in this specification, an "engine" (or "software engine") refers to a software implemented input/output system that provides an output that is different from the input. An engine can be an encoded block of functionality, such as a library, a platform, a Software Development Kit ("SDK"), or an object. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 5:
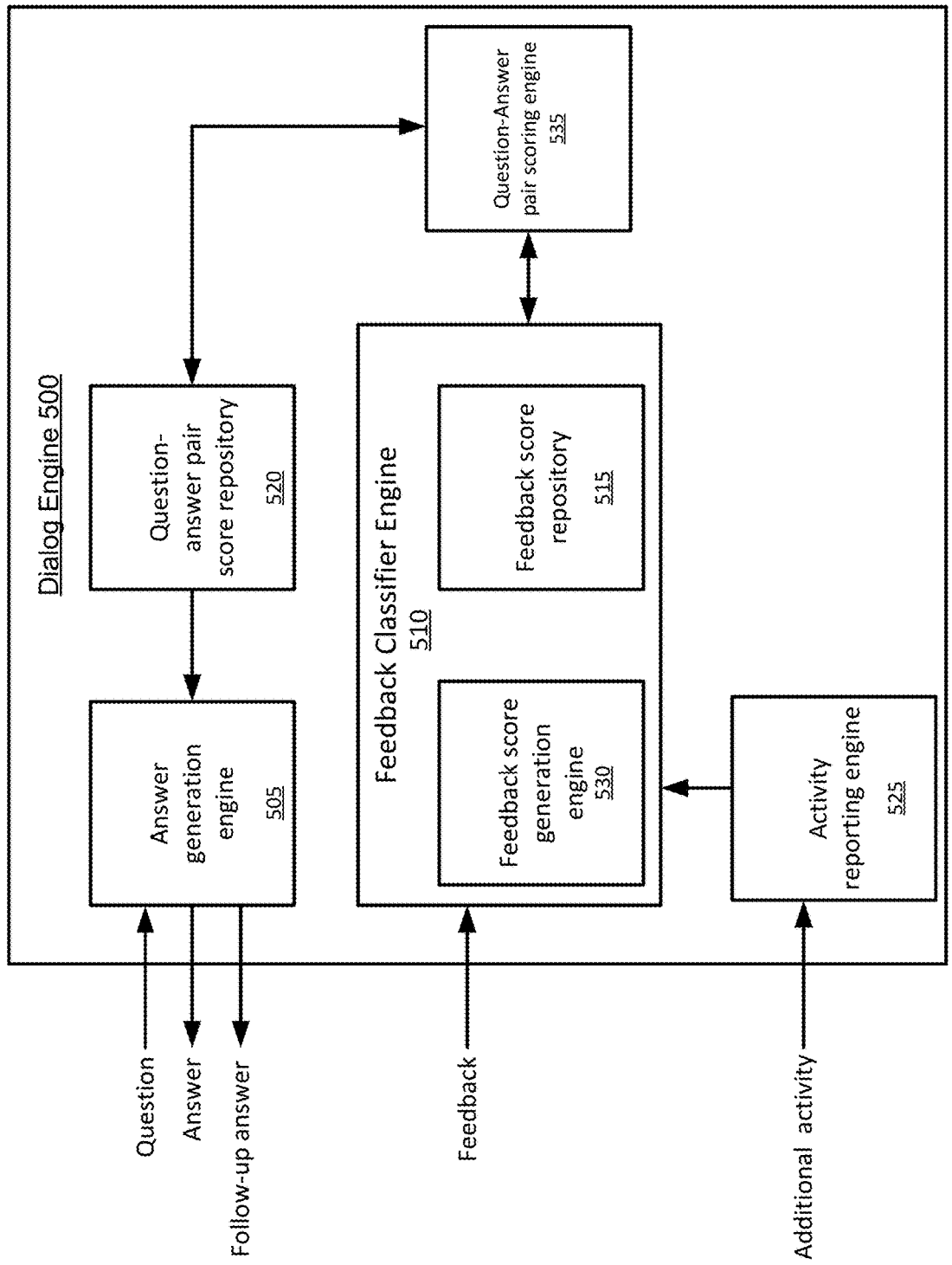
FIG. 5 illustrates example functional components of a dialog engine in accordance with one or more implementations.

FIG. 5 illustrates example functional components of a dialog engine 500. The dialog engine 500 may correspond to a user device 305, a question-answer pair score repository server 310, a feedback classifier server 312, and/or a feedback score repository server 315. As shown in FIG. 5, the dialog engine 500 may include modules 505-530. Any, or all, of modules 505-530 may be implemented by one or more memory devices, such as memory 404 and/or memory 464, and/or one or more processors, such as processor 408 and/or processor 452. Furthermore, multiple modules may be associated with the same memory device and/or processor. For example, one memory device, or one set of memory devices, may store information associated with two or more of modules 505-530. Examples of the functionality of some or all of the functional components, illustrated in FIG. 5, are described below in conjunction with the example scenario illustrated in FIGS. 2A-2E.

An answer generation engine 505 may receive a data representation of a question. In some implementations, the question may be received as audio information via, for example, one or more audio input devices, such as a microphone, associated with a user device 305. Additionally, or alternatively, the question may include any other type of information, such as text information, image information, etc., received via any interface associated with the user device 305. For example, with reference to the example illustrated in FIG. 2A, the answer generation engine 505 may receive the question, "What was the highest grossing romantic comedy of 2003?"

Assume, in this example, that the question was provided as audio information. In some implementations, the answer generation engine 505 may convert the audio information, associated with the question, into text information. In other words, the answer generation engine 505 may perform a speech-to-text process on the audio information associated with the question. The answer generation engine 505 may store the text information associated with the question for further processing.

In some implementations, the answer generation engine 505 may generate an answer to the received question. When generating the answer, the answer generation engine 505 may provide a search query to a search engine, such as the search engine server 320. The search query may be based on the question. For example, the search query may include some or all of the text information associated with the question. In some implementations, the search query may include the entire question, while, in some implementations, the search query may include only a portion of the question. When including only a portion of the question, answer generation engine 505 may omit certain words from the search query. These certain words may include words that are predetermined as unimportant to the question, such as "stop words," including "the," "a," "is," "at," "on," or the like. Additionally, or alternatively, answer generation engine 505 may modify one or more words of the question when generating the search query. For example, answer generation engine 505 may eliminate prefixes and/or suffixes. Continuing with the example above, answer generation engine 505 of some implementations may generate the search query, "highest grossing romantic comedy 2003."

The answer generation engine 505 may receive one or more results that are responsive to the search query from search engine server 320, and may generate an answer based on the received results. The results may each be associated with a respective confidence score that is based on one or more of a variety of factors, such as relevance of a document associated with the result to the search query, a measure of quality of a document associated with the result, an amount of traffic to and/or from a document associated with the result, an age of a document associated with the result, or any other factor associated with the result. For example, the answer generation engine 505 may generate an answer based on a highest-scoring result.

In addition to, or in lieu of, generating an answer based on search results provided by the search engine server 320, the answer generation engine 505 may generate an answer based on information received from a question-answer pair score repository 520. As further described below, the question-answer pair score repository 520 may store information that correlates question-answer pairs—e.g., question-answer pair scores. The answer generation engine 505 may use this information to identify an answer to the question. In some implementations, the answer generation engine 505 may compare the question to information stored by the question-answer pair score repository 520 to identify whether the question-answer pair score repository 520 stores information correlating the question to one or more answers. For instance, the answer generation engine 505 may determine whether a question, associated with a question-answer pair, exactly matches the received question.

Additionally, or alternatively, the answer generation engine 505 may determine whether a question, associated with a question-answer pair, is similar to the received question, at least beyond a particular similarity threshold. The answer generation engine 505 may determine the similarity of the received question to a question associated with a question-answer pair based on one or more indicators of similarity, such as semantic similarity, hamming distance, edit distance, or any other indicator of similarity. Additionally, or alternatively, the answer generation engine 505 may ignore one or more words, such as stop words, in the received question and/or in a question associated with a question-answer pair. For example, the answer generation engine 505 may determine that a question-answer pair, associated with the question, "Which romantic comedy movie made the most money in 2003?", is similar beyond a similarity threshold to the example received question, "What was the highest grossing romantic comedy of 2003?"

In some implementations, the answer generation engine 505 may generate an answer based on the information received from the question-answer pair score repository 520. For instance, the answer generation engine 505 may select a question-answer pair with a highest confidence score, out of question-answer pairs that are associated with the received question. As mentioned above, the generated answer may additionally, or alternatively, be based on one or more search results received from the search engine server 320. The answer generation engine 505 may output the answer via audio information—e.g., through one or more audio output devices, such as a speaker; via visual information—e.g., through one or more visual output devices, such as a display screen; or via any other technique. Continuing with the above example, the answer generation engine 505 may output the answer "Gigli."

Thus, the answer generation engine 505 may output an answer based on information received from the search engine server 320, based on information received from the question-answer pair score repository 520, or based on information received from both the search engine server 320 and the question-answer pair score repository 520. Additionally, and as further described below, the answer generation engine 505 may also output one or more follow-up answers based on a characterization of a user's feedback.

The question-answer pair scoring engine 510 may receive feedback regarding the answer provided by the answer generation engine 505. For example, with reference to FIG.

2C, the user device 305 may receive the feedback, "That can't be right." As similarly described above with respect to the question, the user device 305 may receive the feedback via any type of information, such as audio information, text information, image information, etc. In some implementations, when the feedback is received via audio information, the dialog engine 500 may convert the audio information to text information using a speech-to-text technique.

Based on the received feedback, a feedback classifier engine 510 may determine whether the answer, provided by the answer generation engine 505, is a suitable answer for the question received by the answer generation engine 505. In order to make this determination, the answer generation engine 505 may receive feedback score information from a feedback score repository 515, which may indicate a score associated with the feedback. The feedback score, described further below with respect to FIG. 6, may indicate how to interpret the feedback. In some implementations, as similarly described above, the feedback score may be associated with the exact feedback and/or may be similar to the feedback, beyond at least a similarity threshold.

The feedback classifier engine 510 may identify that the feedback is associated with a question-answer pair. For example, the question-answer pair may be associated with a question that was asked and/or an answer that was provided within a threshold time of the received feedback—e.g., within fifteen seconds, thirty seconds, one minute, etc. of the received feedback. For instance, assume that user answer generation engine 505 provides the answer "Gigli" ten seconds before receiving the feedback "That can't be right." The feedback classifier engine 510 may determine that the received feedback is associated with the question-answer pair that includes the question "What was the highest grossing romantic comedy of 2003?" and the answer "Gigli."

Additionally, or alternatively, the feedback classifier engine 510 may determine that the received feedback is associated with the last question that was asked and/or the last answer that was provided, if there was no other feedback provided. For example, the feedback classifier engine 510 may receive the feedback "That can't be right" twenty minutes after providing the answer "Gigli." Assume, for this example, that the feedback classifier engine 510 has not received other feedback between providing the answer and receiving the feedback "That can't be right." The feedback classifier engine 510 may determine that the received feedback is associated with the question-answer pair that includes the question "What was the highest grossing romantic comedy of 2003?" and the answer "Gigli." In some such implementations, this determination may be made independent of whether a threshold time was exceeded between the question being received, the answer being provided, and/or the feedback being received.

In some implementations, when identifying the question-answer pair, the feedback classifier 510 may omit one or more words and/or characters associated with the feedback, the question, and/or the answer. For instance, continuing with the above example, the feedback classifier engine 510 of some implementations may determine that the feedback "That can't be right" is associated with a question-answer pair that includes a modified version of the question, e.g., "highest grossing romantic comedy 2003," and the answer "Gigli."

A question-answer pair scoring engine 535 may, in some implementations, generate a question-answer pair based on a received question and answer. Additionally, or alternatively, the question-answer pair scoring engine 535 may receive information regarding question-answer pairs from a question-answer pair score repository 520, and may identify that the received question and/or answer is associated with information received from the question-answer pair score repository 520. The information received from the question-answer pair score repository 520 may include question-answer pairs and associated question-answer pair scores. As further described below with respect to FIG. 7, these question-answer pair scores may indicate the strength of answers to associated questions.

The question-answer pair scoring engine 535 may generate or modify question-answer pair scores based on the received feedback. For example, the feedback classifier engine 510 may identify that the feedback "That can't be right" is associated with a feedback score that reflects that the feedback "That can't be right" is negative feedback, such as a score of 0.0 on a scale of 0.0-1.0. Additionally, the feedback classifier engine 510 may identify that the question-answer pair score, for the question "What was the highest grossing romantic comedy of 2003?" and the answer "Gigli," is 0.1, on a scale of 0.0-1.0. In other words, the answer "Gigli" may be considered as not a strong answer for the question "What was the highest grossing romantic comedy of 2003?" Based on identifying the feedback score, the feedback classifier engine 510 may communicate with the question-answer pair scoring engine 535 to adjust the question-answer pair score. For example, the question-answer pair scoring engine 535 may increase or decrease the question-answer pair score based on the feedback as classified by the feedback classifier engine 510.

Assume, for example, that a question-answer pair, for the question "What was the highest grossing romantic comedy of 2003?" and the answer "Gigli," is not received from the question-answer pair score repository 520. The question-answer pair scoring engine 535 may generate a question-answer pair for the question "What was the highest grossing romantic comedy of 2003?" and the answer "Gigli." In such an example, the question-answer pair scoring engine 535 may generate a question-answer pair score for the question-answer pair. In some implementations, the question-answer pair score may be a default score that is in the middle of possible scores. For example, assume that the range of possible question-answer scores is 0.0-1.0. In this example, the question-answer pair scoring engine 535 may assign a question-answer pair score of 0.5 to the question-answer pair. In some implementations, the default question-answer pair score may be a score that is not in the middle of possible scores. For example, the default score may be 0.0, 0.1, 0.4, 0.6, 0.8, 0.9, or any other score within the range of possible scores.

When adjusting the question-answer pair score, the question-answer pair scoring engine 535 may use any mathematical operation that involves the feedback score and/or other feedback scores associated with the question-answer pair scores and identified by the feedback classifier engine 510—e.g., other feedback scores that are based on feedback provided by users of one or more other user devices 305. For example, the question-answer pair scoring engine 535 may average the feedback score with other feedback scores associated with the question-answer pair score, may add a value based on the feedback score to the question-answer pair score, may multiply the question-answer pair score by a value that is based on the feedback score, or may perform any other operation that is based on the feedback score and the question-answer pair score.

In some implementations, the question-answer pair scoring engine 535 may provide the generated or modified question-answer pair score to the question-answer pair score repository 520. The question-answer pair score repository 520 may update information, stored by the question-answer pair score repository 520, based on the generated or modified question-answer pair score. For example, the question-answer pair scoring repository 520 may replace a stored question-answer pair score for the question "What was the highest grossing romantic comedy of 2003?" and the answer "Gigli" with the modified question-answer pair score received from the question-answer pair scoring engine 535.

As mentioned above, the feedback score repository 515 may store information regarding various feedback, such as feedback scores. In some implementations, the feedback score repository 515 may be a part of the feedback classifier engine 510. In some other implementations, the feedback repository 515 may be separated from the feedback classifier engine 510. In some implementations, the feedback score repository 515 may be implemented as one or more devices, such as the feedback score repository server 315, that are separate from the user device 305. Additionally, or alternatively, some or all of the information stored by the feedback score repository 515 may be stored by the user device 305. An example table of information that may be stored by the feedback score repository 515 is described below with respect to FIG. 6.

As also mentioned above, the question-answer pair score repository 520 may store information regarding various question-answer pairs, such as question-answer pair scores. In some implementations, the question-answer pair score repository 520 may be implemented as one or more devices, such as the question-answer pair score repository server 310, that are separate from a user device 305. Additionally, or alternatively, some or all of the information stored by the question-answer pair score repository 520 may be stored by a user device 305. An example table of information that may be stored by the question-answer pair score repository 520 is described below with respect to FIG. 7.

An activity reporting engine 525 may receive additional activity related to the answer or the feedback. The activity reporting engine 525 may provide information identifying the additional activity to the answer generation engine 505 and/or to the feedback classifier engine 510. For example, a user may initiate a search, call a telephone number, send an e-mail, or perform any other activity after the answer generation engine 505 provides a response. In some implementations, the feedback classifier engine 510 may determine that the activity is feedback to the answer based on the relationship between the answer and the activity. As another example, a user may perform a follow-up activity after the feedback classifier engine 510 receives feedback.

A feedback score generation engine 530 may analyze the feedback and/or the additional activity, in addition to the question and/or the answer in some implementations, in order to generate or modify a feedback score associated with the feedback. For example, if a user repeats a question—e.g., the same question and/or a semantically similar question—either after providing feedback or as a part of the feedback, the feedback score generation engine 530 may identify that the provided feedback is associated with a poor answer. Accordingly, the feedback score generation engine 530 may reduce a feedback score associated with the feedback, and/or generate a feedback score that indicates the feedback is associated with a poor answer.

Assume, as another example, that a user provides a follow-up question, that is associated with a topic of an answer provided by the answer generation engine 505. In this example, the feedback classifier engine 510 may identify that the provided feedback is associated with a strong answer. Accordingly, the feedback score generation engine 530 may increase a feedback score associated with the feedback, and/or generate a feedback score that indicates the feedback is associated with a strong answer. Other examples of additional activity by a user, that may indicate that feedback from the user is associated with a strong answer, may include the user initiating a search that is unrelated to the question, the user calling a phone number associated with the answer, the user sending an email to an email address associated with the answer, etc. The feedback score generation engine 530 may provide the generated or modified feedback scores to the feedback score repository 515.

As mentioned above, the answer generation engine 505 may provide a follow-up answer when a user expresses dissatisfaction with an answer—e.g., when a feedback score, based on feedback received by the feedback classifier engine 510 and/or based on additional activity received by the activity reporting engine 525, is below a threshold feedback score. Continuing with the above example, as shown in FIG. 2E, the answer generation engine 505 may provide the follow-up answer "How to Lose a Guy in 10 Days," based on the feedback, "That can't be right," received by the feedback classifier engine 510. The answer generation engine 505 may select the follow-up answer from a set of candidate answers that have been identified in response to the question.

For example, and as discussed above, the answer generation engine 505 may select, for the follow-up answer, a question-answer pair with a second highest score, out of question-answer pairs that are associated with the received question—in a scenario where the user provided negative feedback in response to an answer based on the question-answer pair with the highest score. Furthermore, and as also mentioned above, the follow-up answer may additionally, or alternatively, be based on one or more search results received from a search engine such as the search engine server 320.

Thus, in some implementations, the answer generation engine 505 may provide a follow-up answer based on the feedback received by the feedback classifier engine 510. In some implementations, the answer generation engine 505 may provide a follow-up answer based on additional activity, received by the activity reporting engine 525 and subsequent to feedback received by the feedback classifier engine 510. Additionally, or alternatively, the feedback score generation engine 530 may use additional activity, received by the activity reporting engine 525 and subsequent to the feedback received by the feedback classifier engine 510, to generate or modify a feedback score associated with the feedback received by the feedback classifier engine 510.

Although examples of scores were discussed above with respect to FIG. 5, some implementations may use different scores, and/or ranges of scores, to implement similar concepts as described above. For example, while one example score range is 0.0-1.0, other score ranges are possible, such as 0-100, 1-10, 2-7, −100 through −1, or any other score range. Additionally, where some implementations use scores at a high end of a score range, e.g., as an indication of strength of an answer to a question, other implementations may use scores at a low end of a score range. For example, in one such implementation, a feedback of "that's right" may be associated with a feedback score of −100, −0.1, 0.0, 0.1, etc., while a feedback of "that's wrong" may be associated with a feedback score of 0.9, 1.0, 9, 10, 90, 100, etc.

Although FIG. 5 shows example functional components of the dialog engine 500, in other implementations, the dialog engine 500 may include fewer, different, or additional functional components than depicted in FIG. 5. In still other implementations, one or more functional components of the dialog engine 500 may perform the tasks performed by one or more other functional components of the dialog engine 500.

Furthermore, one or more servers, such as one or more of the servers shown in FIG. 3, may perform the tasks performed by one or more functional components of the dialog engine 500. For example, the question-answer pair score repository server 310 may perform the functions of the question-answer pair score repository 520, and/or the feedback score repository server 315 may perform the functions of the feedback score repository 515. In one such implementation, information that a user device 305 provides to and/or receives from the question-answer pair score repository 520 and/or the feedback score repository 515 may be provided to and/or received from the question-answer pair score repository server 310 and/or the feedback score repository server 315, respectively. In some implementations, the question-answer pair score repository server 310 may perform the functions of the question-answer pair score repository 520 in lieu of the question-answer pair score repository 520 performing such functions, and/or the feedback score repository server 315 may perform the functions of the feedback score generation engine 530 in lieu of the question-answer pair score repository 520 performing such functions. In some such implementations, information that a user device 305 would provide to and/or receive from the question-answer pair score repository 520 and/or the feedback score repository 515 may be instead provided to and/or received from the question-answer pair score repository server 310 and/or the feedback score repository server 315, respectively.

Furthermore, in some implementations, the feedback classifier engine 510 may receive additional activity information from one or more user activity logs, in addition to, or in lieu of, receiving additional activity information from the activity reporting engine 525. For example, a user activity log repository server may store user activity logs associated with multiple users, including additional activity information, question-answer activity, and/or feedback activity. The activity reporting engine 525 may receive user activity information from such a user activity log repository server.

FIG. 6 illustrates an example data structure 600 that may be stored by a feedback score repository, such as feedback score repository server 315 and/or one or more devices that implement the feedback score repository 515. Data structure 600 may associate feedback, such as feedback received by the feedback classifier engine 510 or predetermined feedback types, may be associated with a respective feedback score. Assume that the feedback scores are associated with a range of 0.0-1.0, with 0.0 being associated with feedback that indicates that an answer is a poor answer, and with 1.0 being associated with feedback that indicates that an answer is a strong answer.

In the example shown in FIG. 6, the feedback "Awesome thanks" and the feedback "Great answer" may be associated with a feedback score of 1.0, the feedback "Maybe" and the feedback "I guess" may be associated with a feedback score of 0.5, the feedback "That may not be right" may be associated with a feedback score of 0.2, and the feedback "That's wrong" and the feedback "Wrong answer" may be associated with a feedback score of 0.0. As discussed above, other score ranges are possible in practice. As further discussed above, in some implementations, a higher score may be associated with a feedback that indicates that an answer is a poorer answer, while a lower score may be associated with a feedback that indicates that an answer is a stronger answer.

FIG. 7 illustrates an example data structure 700 that may be stored by a question-answer score repository, such as the question-answer pair score repository server 310 and/or one or more devices that implement the question-answer pair score repository 520. Data structure 700 may associate question-answer pairs with a question-answer pair score. Assume that, the question-answer pair scores are associated with a range of 0.0-1.0, with 0.0 being associated with a poorest answer, and with 1.0 being associated with a strongest answer.

Each row, of rows 705-735, may be associated with a particular question-answer pair. For example, row 705 may be associated with the question-answer pair that includes the question "Who invented the telephone?" and "Alexander Graham Bell," and an associated question-answer pair score of 0.9. Row 710 may be associated with the question-answer pair that also includes the question "Who invented the telephone?" The answer associated with the question-answer pair in row 710 may be a different answer than that associated with the question-answer pair in row 705. Specifically, in the example shown in FIG. 7, the answer associated with the question-answer pair of row 710 is "Marty McFly." The associated question-answer pair score may be 0.1, which may indicate that "Marty McFly" is a poor answer for the question "Who invented the telephone."

As is apparent from the example shown in FIG. 7, in some implementations, data structure 700 may store multiple question-answer pairs that are associated with the exact same question—e.g., the question-answer pairs shown in rows 705 and 710 are both associated with the question "Who invented the telephone?" Additionally, or alternatively, data structure 700 may store a single question-answer pair for a single question—e.g., the question-answer pair of row 715 includes a question that is not associated with any other question-answer pairs stored by data structure 700. Additionally, or alternatively, data structure 700 may store multiple question-answer pairs that include similar questions—e.g., the question-answer pair of row 730 includes the question "What is the best Canadian band?", while the question-answer pair of row 735 includes the question "Who is the best band from Canada?"

While data structures 600 and 700 are represented in FIGS. 6 and 7, respectively, as tables with rows and columns, in practice, data structures 600 and 700 may include any type of data structure, such as a linked list, a tree, a hash table, a database, or any other type of data structure. Data structures 600 and/or 700 may include information generated by a user device 305, or by one or more functional components described above with respect to FIG. 5. Additionally, or alternatively, data structures 600 and/or 700 may include information provided from any other source, such as information provided by one or more users, and/or information automatically provided by one or more other devices.

In some implementations, data structures 600 and/or 700 may omit punctuation. Alternatively, data structures 600 and/or 700 may include punctuation, such as question marks associated with questions, periods, commas, apostrophes, hyphens, and/or any other type of punctuation.

Figure 8:
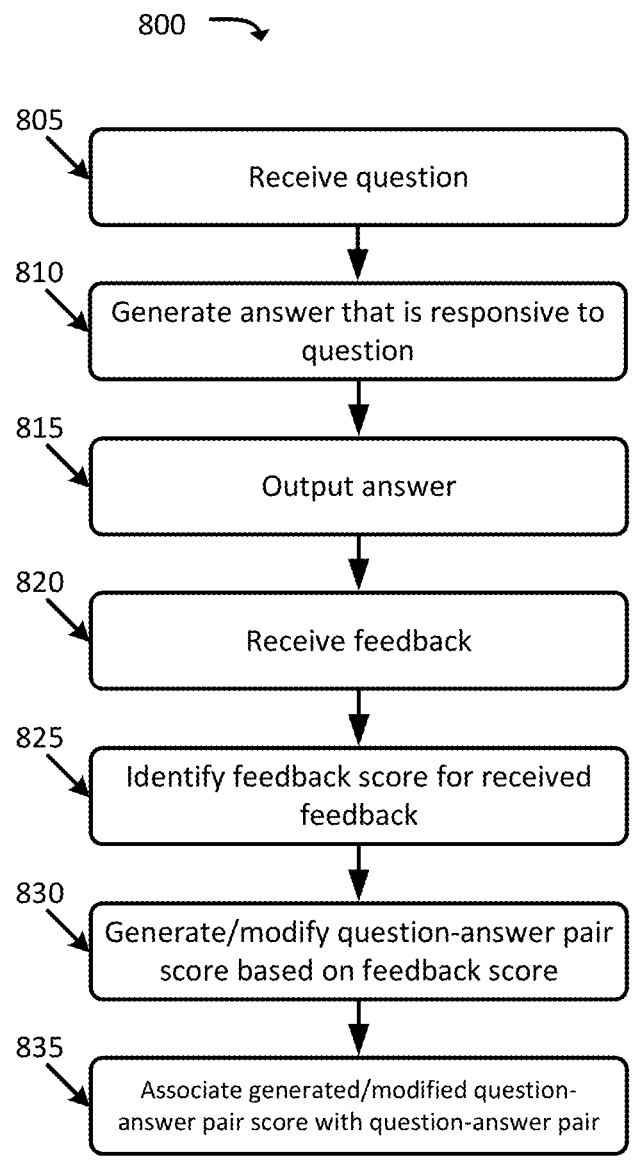
FIGS. 8 and 9 illustrate flowcharts of example processes for generating or modifying a score for a question-answer pair based on user feedback, according to one or more implementations described herein.
Figure 9:
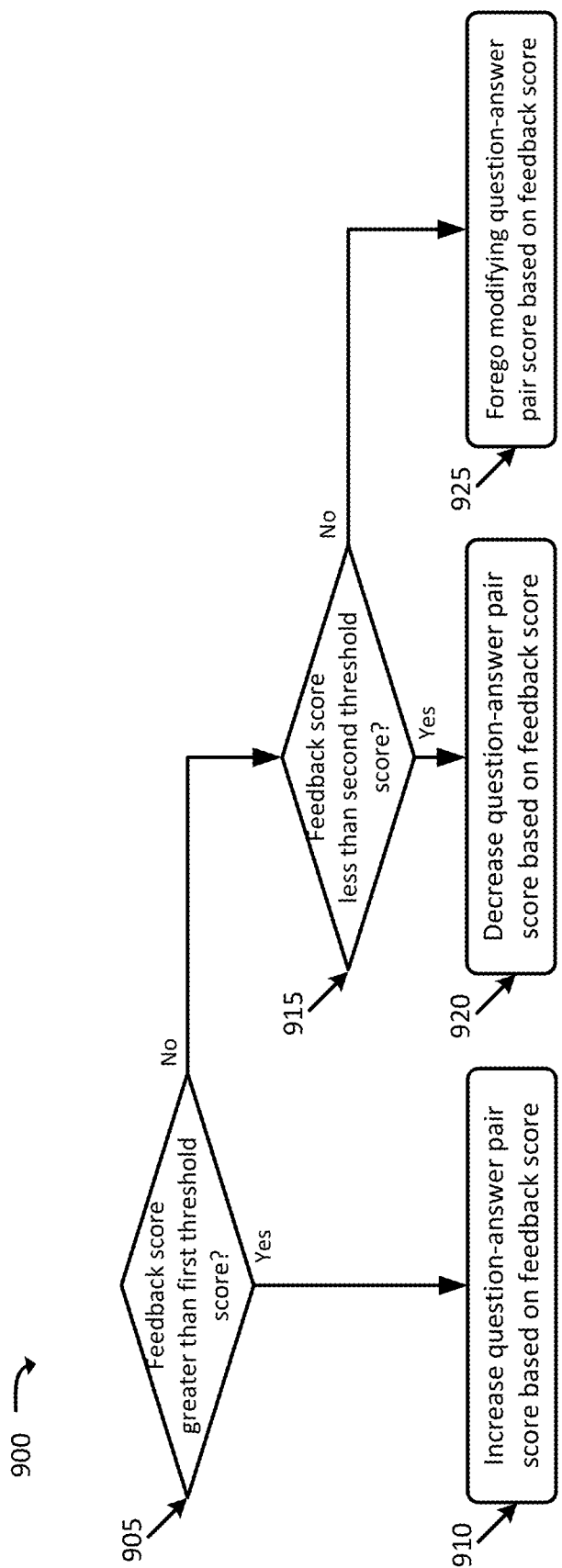

FIGS. 8 and 9 illustrate flowcharts of example processes for generating or modifying a score for a question-answer pair based on user feedback. The processes 800 and 900 will be described as being performed by a computer system comprising one or more computers, for example, the user device 305, and/or one or more of the servers 310-320 as shown in FIG. 3, and/or the dialog engine 500 as shown in FIG. 5. However, for the sake of simplicity, processes 800 and 900 are described below as being performed by the user device 305.

Process 800, shown in FIG. 8, may include receiving a question (block 805). In some implementations, receiving a question may include receiving, by a dialog engine, a first input that specifies a question, where the first input may be voice input. For example, as described above with respect to the answer generation engine 505, the user device 305 may receive a question, such as an audible question spoken by a user. Referring to the example scenario shown in FIG. 1A, user device 305 may receive the question "Who invented the telephone?"

Process 800 may further include generating an answer that is responsive to the question (block 810). For example, as described above with respect to the answer generation engine 505, the user device 305 may receive or generate an answer to the question received at block 805. For instance, as described above, the user device 305 may use information stored in the question-answer pair score repository server 310 and/or information received from the search engine server 320 when generating an answer at block 810.

Process 800 may also include outputting the answer (block 815). In some implementations, outputting the answer may include providing, by the dialog engine, an answer to the question. For example, as described above with respect to the answer generation engine 505, the user device 305 may output the answer, generated at block 810, via an audio output device, a visual output device, or any other technique of outputting information. Referring to the example scenario shown in FIG. 1B, user device 305 may output the answer "Alexander Graham Bell."

Process 800 may additionally include receiving feedback (block 820). For example, as described above with respect to question-answer pair scoring engine 510, user device 305 may receive feedback, such as audible feedback spoken by the user. Referring to the example scenario shown in FIG. 1C, user device 305 may receive the feedback "Thanks."

In some implementations, receiving feedback may include receiving, by the dialog engine, a voice input, where the voice input may be spoken input, and determining, by the dialog engine, that the voice input is classified as feedback to the answer. For example, determining that the voice input is classified as feedback may include determining that a time difference between a time associated with providing the answer and a time associated with receiving the voice input is within a predetermined time. As another example, determining that the voice input is classified as feedback may include determining that the voice input is received after providing the answer to the question. As another example, determining that the voice input is classified as feedback may include determining that the voice input is semantically similar to the question. As another example, determining that the voice input is classified as feedback may include identifying an action associated with the voice input, where the action may be calling a telephone number associated with the answer, or sending an email to an email address associated with the answer.

Process 800 may further include identifying a feedback score for the received feedback (block 825). In some implementations, identifying a feedback score for the received feedback may include determining a feedback score associated with the voice input after determining, by the dialog engine, that the voice input is classified as feedback to the answer. In some implementations, identifying a feedback score may include identifying, by the system, a predetermined feedback score associated with the feedback. In some implementations, identifying a predetermined feedback score associated with the feedback may include normalizing the feedback; and identifying the predetermined feedback score based on the normalized feedback. For example, as described above with respect to the feedback classification engine 510, the user device 305 may receive or generate a feedback score for the feedback received at block 820. Assume, for instance, that the user device 305 identifies a feedback score of 1.0 for the feedback "Awesome thanks." The user device 305 may determine that the feedback "Awesome thanks" is similar to the feedback "Thanks," received at block 820, and may thus associate the feedback score of 1.0 for the feedback "Thanks."

Process 800 may also include generating or modifying a question-answer pair score based on the feedback score (block 830). For example, as described above with respect to question-answer pair scoring engine 535, the user device 305 may generate or modify a question-answer pair score based on the feedback score received at block 825. Continuing with the above example, the user device 305 may identify a previous question-answer pair score of 0.9 for a question-answer pair that includes the question "Who invented the telephone?" and the answer "Alexander Graham Bell." For instance, the question-answer pair scoring engine 535 of user device 305 may receive the previous question-answer pair score of 0.9 from the question-answer pair score repository server 310.

The user device 305 may modify the previous question-answer pair score of 0.9 based on the predetermined feedback score of 1.0, associated with the feedback "Thanks." In some implementations, the system may determine the predetermined feedback score is higher than a threshold, and classify the feedback as positive feedback, where the confidence score may be adjusted higher based on classifying the feedback as positive feedback. For example, the user device 305 may increase the previous question-answer pair score based on the feedback score. As mentioned above with respect to the question-answer pair scoring engine 535, user device 305 may adjust a question-answer pair score, at block 830, using one or more of a variety of techniques. In some implementation, generating or modifying a question-answer pair score may include adjusting a confidence score associated with the question and the answer based on the predetermined feedback score. One additional such technique is described below with respect to FIG. 9.

Process 800 may additionally include associating the generated or modified a question-answer pair score with a corresponding question-answer pair (block 835). For example, as described above with respect to the question-answer pair scoring engine 535, the user device 305 may store, e.g., in the question-answer pair score repository 520, and/or output, e.g., to the question-answer pair score repository server 310, the question-answer pair score generated or modified at block 830.

These question-answer pair scores may be used for any number of reasons. For example, these question-answer pair scores may be used when providing answers to additional questions. In some implementations, the system may determine the predetermined feedback score is lower than a threshold, and may classify the feedback as negative feedback, where the confidence score may be adjusted lower based on classifying the feedback as negative feedback. After adjusting the confidence score associated with the answer, the system may identify a second answer to the question, wherein the second answer has a higher confidence score than the adjusted confidence score associated with the answer, and may provide, to the user device 305, the second answer. Additionally, or alternatively, attributes associated with questions, answers, question-answer pairs, and/or question-answer pair scores may be used to train models, such as search engine and/or document ranking models.

As discussed above, process 900, shown in FIG. 9, may correspond to block 825 of FIG. 8. In some implementations, when performing process 900, a device that performs process 900, such as user device 305 and/or any other device, may utilize multiple feedback score thresholds in order to determine whether to adjust a question-answer pair score. Some such implementations may allow user device 305 to adjust a question-answer pair score only when confidence is high that particular feedback is positive or negative.

Process 900 may include determining whether a feedback score, such as the feedback score generated at block 825, is greater than a first threshold (block 905). For example, user device 305 may determine whether a feedback score, received at block 825, is greater than a first threshold score. Assume, for example, that the feedback score is 1.0, and that the first threshold score is 0.8. In such a scenario, user device 305 may determine that the feedback score is above the first threshold score.

If the feedback score is greater than the first threshold score (block 905—YES), then process 900 may include increasing a question-answer pair score based on the feedback score (block 910). In some implementation, a question-answer pair score may be a confidence score associated with the answer, and increasing the question-answer pair score may include classifying the feedback as positive feedback, where the confidence score is adjusted higher based on classifying the feedback as positive feedback. For example, as discussed above with respect to the question-answer pair scoring engine 510, the user device 305 may increase a question-answer pair score for a question-answer pair that includes a question received at block 805 and/or an answer provided at block 810 based on the feedback score received at block 825. Assume, for instance, that the question-answer pair score for a question-answer pair is 0.7. Based on determining that a feedback score associated with the question-answer pair is greater than the first threshold score (at block 905—YES), user device 305 may increase the score to, for example, 0.75, 0.8, or some other value.

If, on the other hand, the feedback score is not greater than the first threshold score (block 905—NO), then process 900 may include determining whether the feedback score is less than a second threshold score (block 915). In some implementations, the second threshold score is less than the first threshold score. In one such implementation, the first and second threshold scores may be separated by some amount. For example, assume that the first threshold score is 0.8. In this example, the low threshold score may be 0.2, 0.1, or some other value that is less than 0.8.

If the feedback score is less than the second threshold score (block 915—YES), then process 900 may include decreasing a question-answer pair score based on the feedback score (block 920). In some implementations, a question-answer pair score may be a confidence score associated with the answer, and decreasing a question-answer pair score may include classifying the feedback as negative feedback, where the confidence score is adjusted lower based on classifying the feedback as negative feedback. For example, as discussed above with respect to the question-answer pair scoring engine 510, the user device 305 may decrease a question-answer pair score for a question-answer pair that includes a question received at block 805 and/or an answer provided at block 810 based on the feedback score received at block 825.

If, on the other hand, the feedback score is not less than the second threshold score (block 915—NO) and is not greater than the first threshold score (block 905—NO), then process 900 may include foregoing modifying a question-answer pair score based on the feedback score. Alternatively, in such a scenario, the user device 305 may modify a question-answer pair score, but the modification may be less extreme than a modification that would be made if the feedback score were greater than the first threshold score or less than the second threshold score.

In other words, the user device 305 may assign a weight to the feedback score when the feedback score is between the first threshold score and the second threshold score. This weight may be lower than a weight assigned to the feedback score when the feedback score is greater than the first threshold score or less than the second threshold score.

While processes 800 and 900 are described above in the example context of generating or modifying a question-answer pair score based on feedback from one user, it should be understood that a question-answer pair score may be generated or modified based on feedback received from multiple users, e.g., multiple users of multiple user devices 305. In some implementations, the system may receive, from a different user device, a second voice input to the provided answer. The system may determine that the second voice input is classified as feedback to the answer. The system may identify a second predetermined feedback score associated with the feedback from the different computing device. The system may then adjust the confidence score associated with the answer based on the feedback from the user device 305 and the feedback from the different user device. In some implementations, a question-answer pair score may not be generated or modified until at least a threshold amount of feedback is received. For example, assume that the threshold amount of feedback is feedback from ten users, and that feedback is received from nine users. Once the tenth feedback is received, a question-answer pair score may be generated or modified. In some implementations, the question-answer pair score may be generated or modified based on all ten of the received feedbacks. In some implementations, the question-answer pair score may be generated or modified based on fewer than ten of the received feedbacks.

In some implementations, a question-answer pair score may not be generated or modified until at least a threshold amount of positive feedback is received, and/or until at least a threshold of negative feedback is received. For example, assume that the threshold amount of positive feedback is positive feedback from five users. Further assume that positive feedback is received from four users. Once the fifth positive feedback is received, a question-answer pair score may be generated or modified. In some implementations, the positive feedback threshold may be the same as the negative feedback threshold. For instance, assuming the positive feedback threshold is positive feedback from five users, the negative feedback threshold may be negative feedback from five users. In an alternative implementation, the positive feedback threshold may be different from the negative feedback threshold. For instance, assuming the positive feedback threshold is positive feedback from five users, the negative feedback threshold may be negative feedback from ten users.

Additionally, or alternatively, the positive feedback threshold and/or the negative feedback threshold may be based on an amount by which the feedback affects a question-answer pair score. For example, assume that the positive feedback threshold is 0.1. In this example, a question-answer pair score may be modified based on a set of feedback if the result of modifying the question-answer pair score is an increase of 0.1 or greater, but not if the result of modifying the question-answer pair score is an increase of 0.1 or greater. Assume, as another example, that the negative feedback threshold is 0.1. In this example, a question-answer pair score may be modified based on a set of feedback if the result of modifying the question-answer pair score is a decrease of 0.1 or greater, but not if the result of modifying the question-answer pair score is a decrease of 0.1 or greater. Some implementations may include both a positive feedback threshold and a negative feedback threshold. In such implementations, a question-answer pair score may be modified if the result is an increase of the question-answer pair score by least the positive feedback threshold, or a decrease of the question-answer pair score by at least the negative feedback threshold.

In some implementations, the positive feedback threshold may be the same as the negative feedback threshold. For instance, assuming the positive feedback threshold is 0.1, the negative feedback threshold may be 0.1. In an alternative implementation, the positive feedback threshold may be different from the negative feedback threshold. For instance, assuming the positive feedback threshold is 0.1, the negative feedback threshold may be 0.2.

In some implementations, positive and negative feedback may affect a question-answer pair score by the same magnitude, but may have opposite values. For example, in such implementations, a positive feedback may cause a question-answer pair score to be increased by 0.01, while a negative feedback may cause the question-answer pair score to be decreased by 0.01. In other words, in such an example, a positive feedback may be assigned a value of +0.01, while a negative feedback may be assigned a value of −0.01.

In some implementations, positive and negative feedback may affect a question-answer pair score by a different magnitude. For example, in some such implementations, a positive feedback may cause a question-answer pair score to be increased by 0.01, while a negative feedback may cause the question-answer pair score to be decreased by 0.02. In other words, in such an example, a positive feedback may be assigned a value of +0.01, while a negative feedback may be assigned a value of −0.02.

Although examples of scores were discussed above with respect to FIGS. 8 and 9, some implementations may use different scores, and/or ranges of scores, to implement similar concepts as described above. For example, while one example score range is 0.0-1.0, other score ranges are possible, such as 0-100, 1-10, 2-7, −100 through −1, or any other score range. Additionally, where some implementations use scores at a high end of a score range, e.g., as an indication of strength of an answer to a question, other implementations may use scores at a low end of a score range. For example, in one such implementation, a feedback of "that's right" may be associated with a feedback score of −100, −0.1, 0.0, 0.1, etc., while a feedback of "that's wrong" may be associated with a feedback score of 0.9, 1.0, 9, 10, 90, 100, etc.

Figure 10:
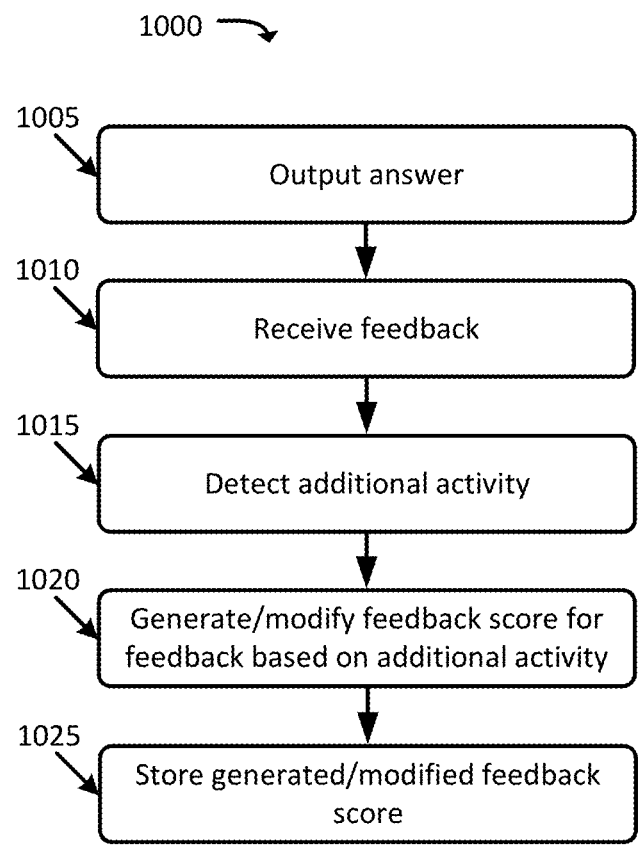
FIG. 10 illustrates a flowchart of an example process for generating or modifying a score for user feedback, according to one or more implementations described herein.

FIG. 10 illustrates a flowchart for generating or modifying a score for user feedback. In some implementations, process 1000 may be performed by a computer system comprising one or more computers, for example, the user device 305, and/or one or more of the servers 310-320 as shown in FIG. 3, and/or the dialog engine 500 as shown in FIG. 5. In some implementations, process 1000 may be performed by one or more other components instead of, or possibly in conjunction with, the user device 305, and/or one or more of the servers 310-320 as shown in FIG. 3, and/or the dialog engine 500 as shown in FIG. 5. However, for the sake of simplicity, process 1000 is described below as being performed by user device 305.

Process 1000 may include outputting an answer (block 1005). For example, as discussed above with respect to answer generation engine 505, user device 305 may output an answer to a question. Process 1000 may also include receiving feedback (block 1010). For example, as discussed above with respect to the question-answer pair scoring engine 510, the user device 305 may receive feedback in response to the answer provided at block 1005. In some implementations, receiving feedback may include receiving a voice input, and determining that the voice input is classified as feedback to the answer. Process 1000 may further include detecting additional activity (block 1015). In some implementations, detecting additional activity may include identifying an action associated with the voice input. For example, as discussed above with respect to the activity reporting engine 525, the user device 305 may detect additional activity associated with the feedback received at block 1010 and/or the answer output at block 1005. In some implementations, the user device 305 may detect that the additional activity was received after the feedback was received at block 1010.

Process 1000 may additionally include generating or modifying a feedback score, associated with the feedback, based on the additional activity (block 1020). In some implementations, generating or modifying a feedback score may include determining that the voice input is classified as feedback to the answer, then determining a feedback score associated with the voice input. For example, as discussed above with respect to the feedback score generation engine 530, the user device 305 may generate or modify a feedback score based on the additional activity detected at block 1015. Process 1000 may further include storing the generated or modified feedback score (block 1025). For example, as described above with respect to the feedback score generation engine 530 and the feedback score repository 515, user device may store the feedback score generated or modified at block 1020.

Figure 11A:
FIGS. 11A-12E illustrate examples of generating or modifying a score for user feedback, according to one or more implementations described herein.
Figure 11B:
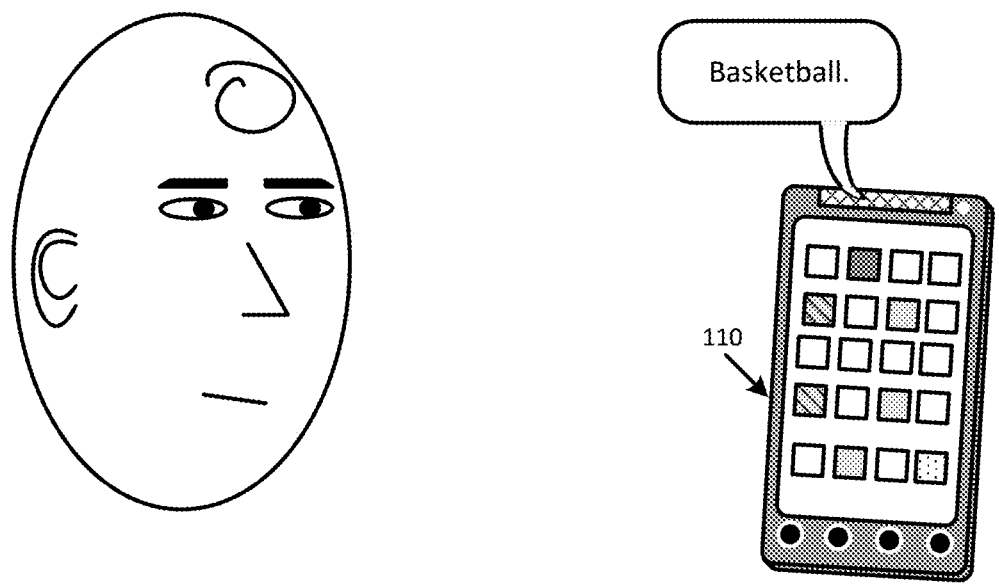
Figure 11C:
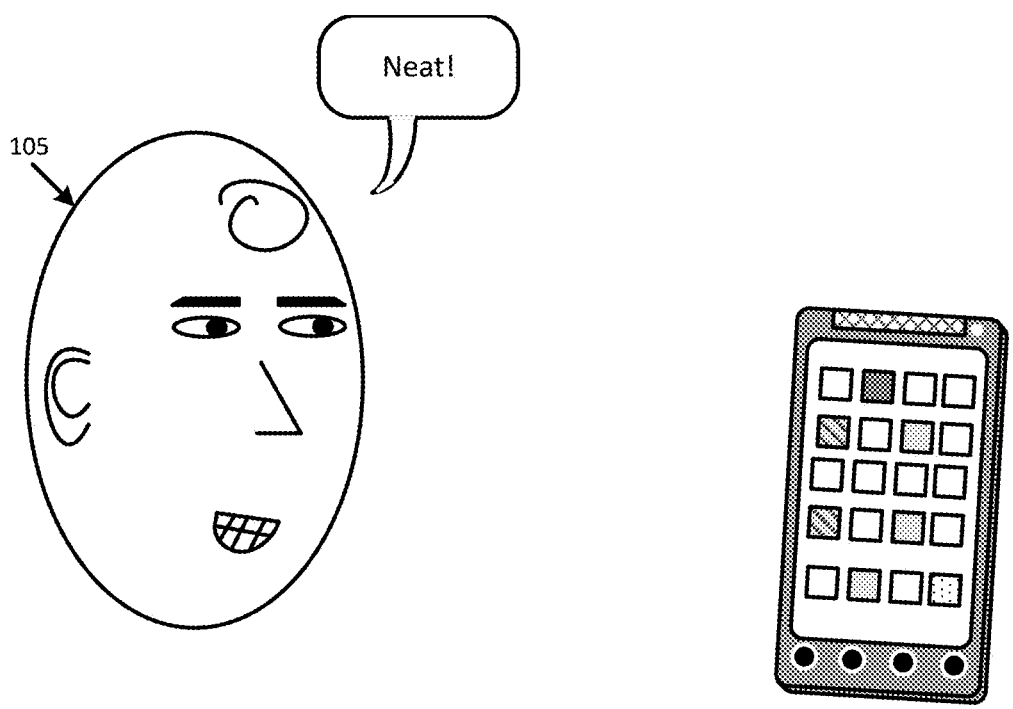
Figure 11D:
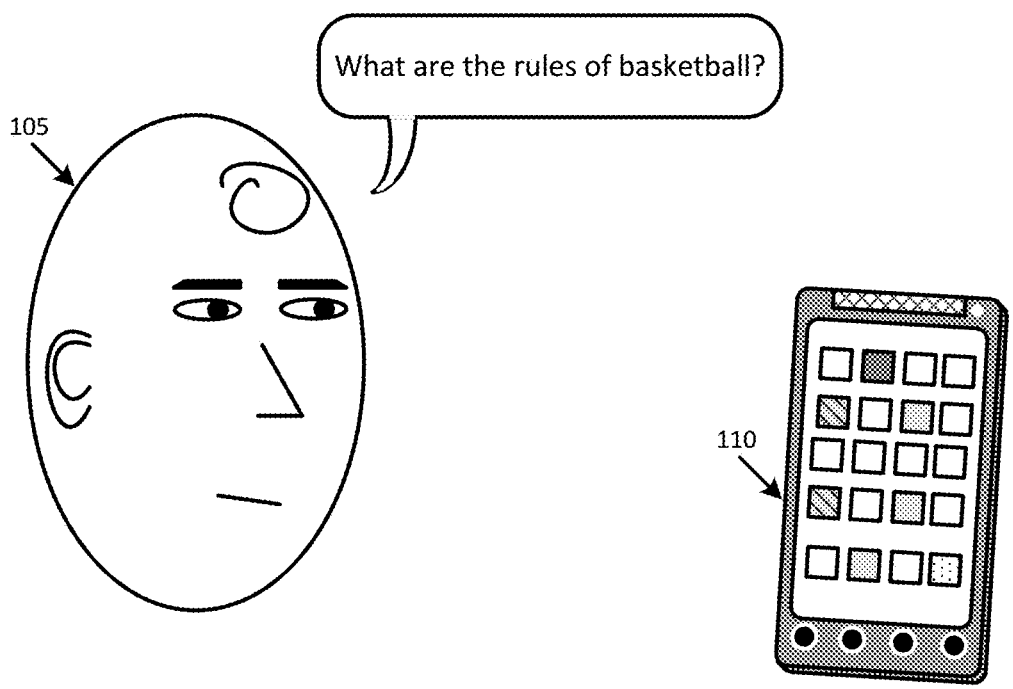

FIGS. 11A-12E illustrate examples of generating or modifying a score for user feedback. As shown in FIG. 11A, a user 105 may ask a question to a user device 110. For example, the user 105 may ask the question "What sport did Michael Jordan play?" As shown in FIG. 11B, the user device 110 may output an answer, such as "Basketball." As shown in FIG. 11C, the user 105 may provide feedback, such as "Neat." As shown in FIG. 11D, the user device 110 may detect additional activity from the user 105, such as the user 105 asking the question "What are the rules of basketball?"

Figure 11E:
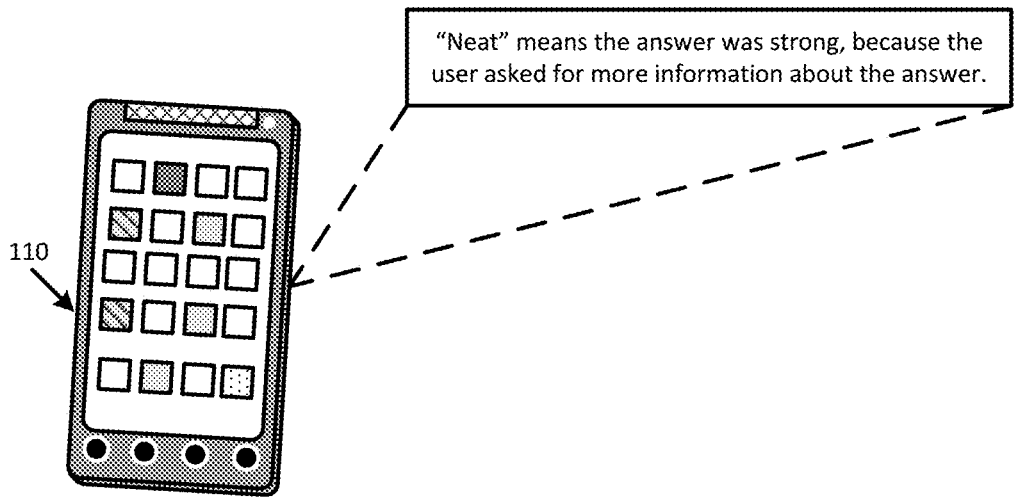

As shown in FIG. 11E, the user device 110 may store an indication that the feedback—specifically, the user speaking the word "Neat," in this example—may identify that an answer is relevant to an asked question. In other words, this indication may indicate that this feedback is provided by a user when an answer is a strong answer. The user device 110 may store this indication based on the additional activity received from the user—specifically, the asking of the question "What are the rules of basketball?"—after the user device 110 has provided the answer "Basketball." As described above with respect to process 1000, the user device 110 may use this indication to modify a feedback score associated with the feedback "Neat." For example, the user device 110 may raise a feedback score associated with the feedback "Neat."

The additional activity in the above example—i.e., the asking of the question, "What are the rules of basketball?"—may indicate that the answer provided to the question was a strong answer. This additional activity may indicate a strong answer because the additional activity is related to a topic that the answer is associated with—e.g., basketball—but does not re-state the question. Since the answer may be a strong answer, the user feedback provided after the answer was provided—i.e., "Neat"—may be identified as feedback that is associated with a strong answer.

Figure 12A:
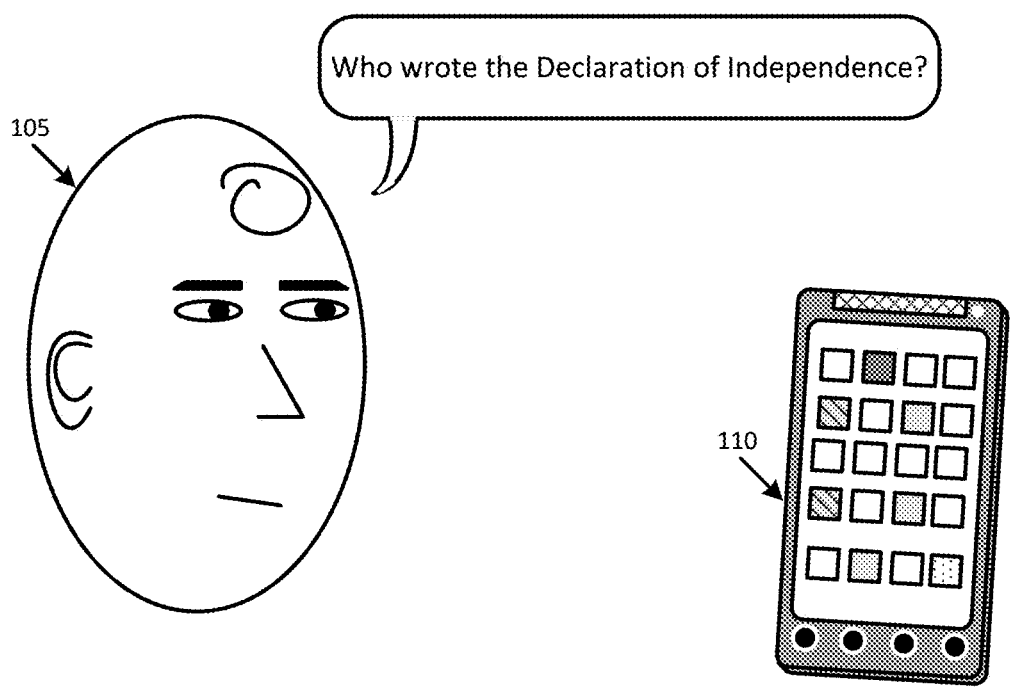
Figure 12B:
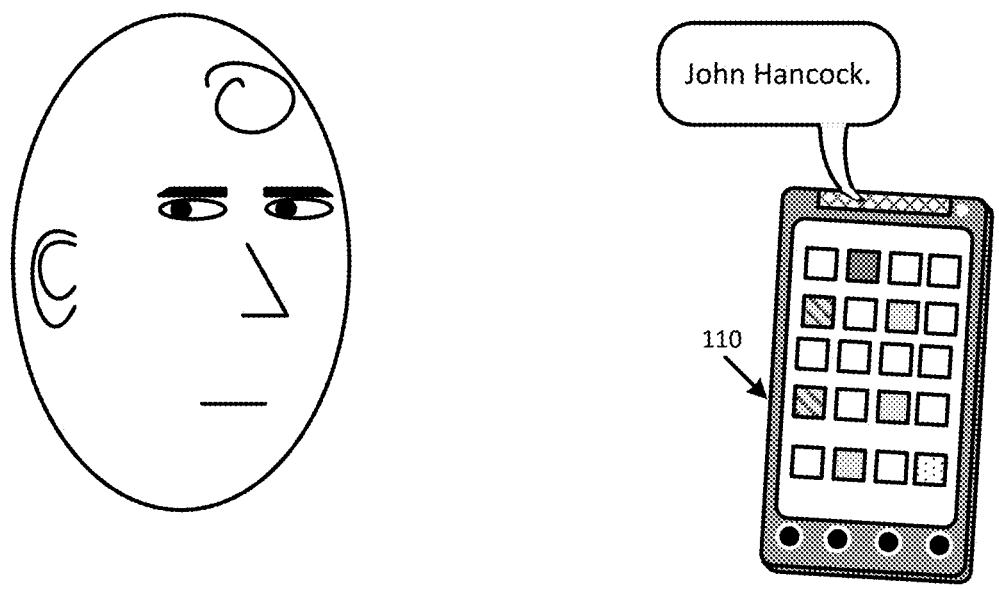
Figure 12C:
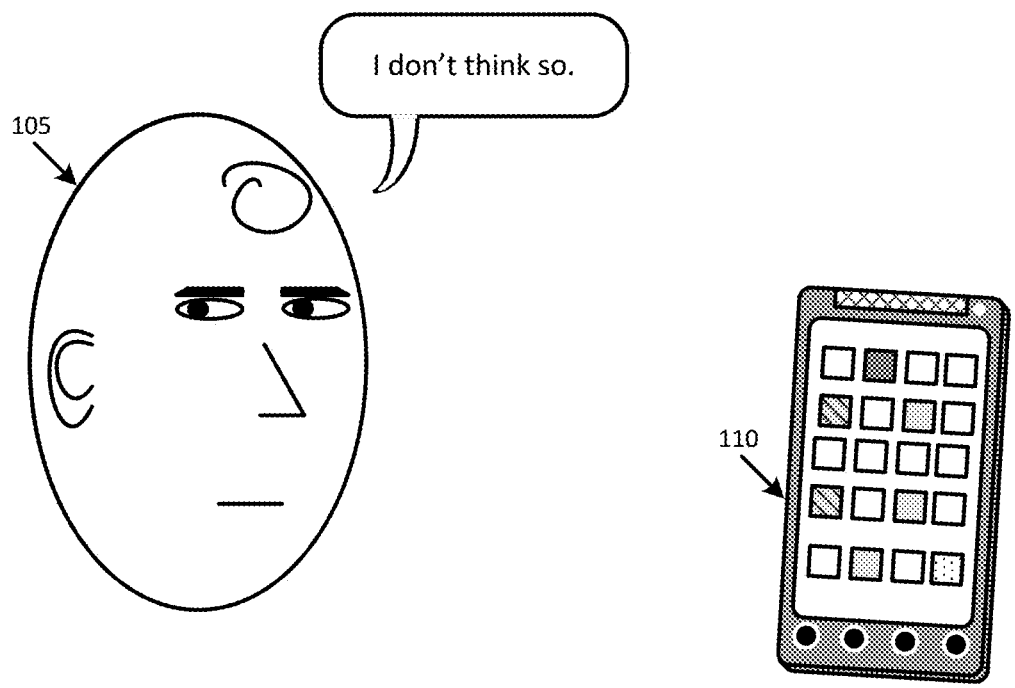
Figure 12D:
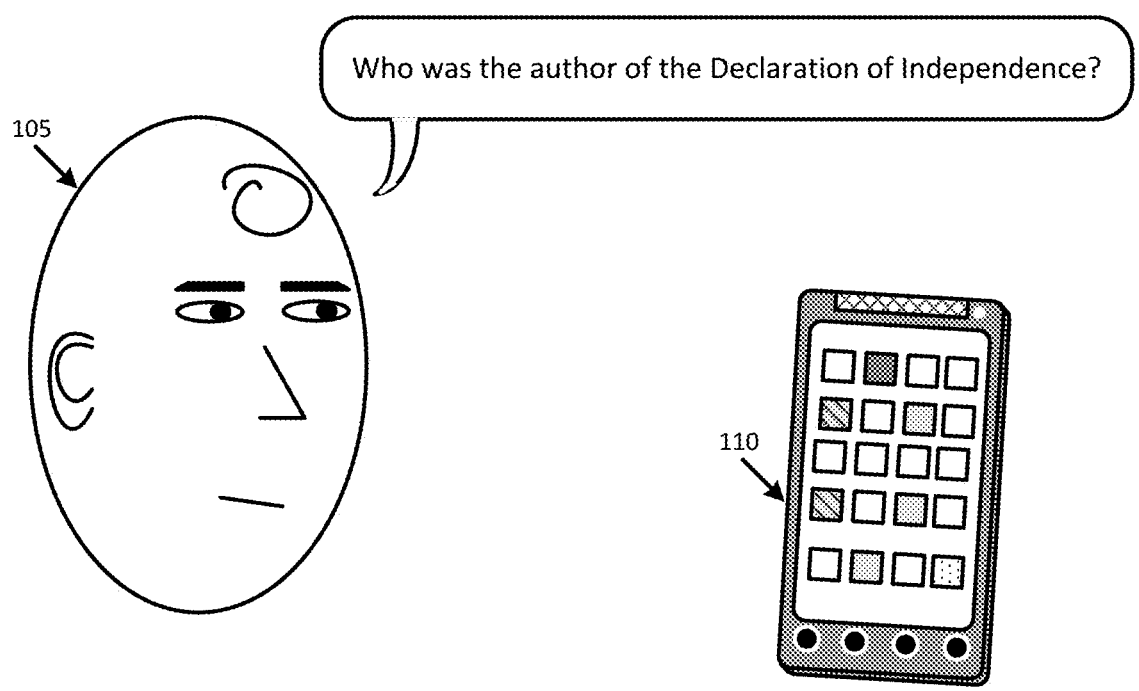

In another example, as shown in FIG. 12A, a user 105 may ask a question to a user device 110. For example, the user 105 may ask the question "Who wrote the Declaration of Independence?" As shown in FIG. 12B, the user device 110 may output an answer, such as "John Hancock." As shown in FIG. 12C, the user 105 may provide feedback, such as "I don't think so." As shown in FIG. 12D, the user device 110 may detect additional activity from the user 105, such as the user 105 asking the question "Who was the author of the Declaration of Independence?"

Figure 12E:
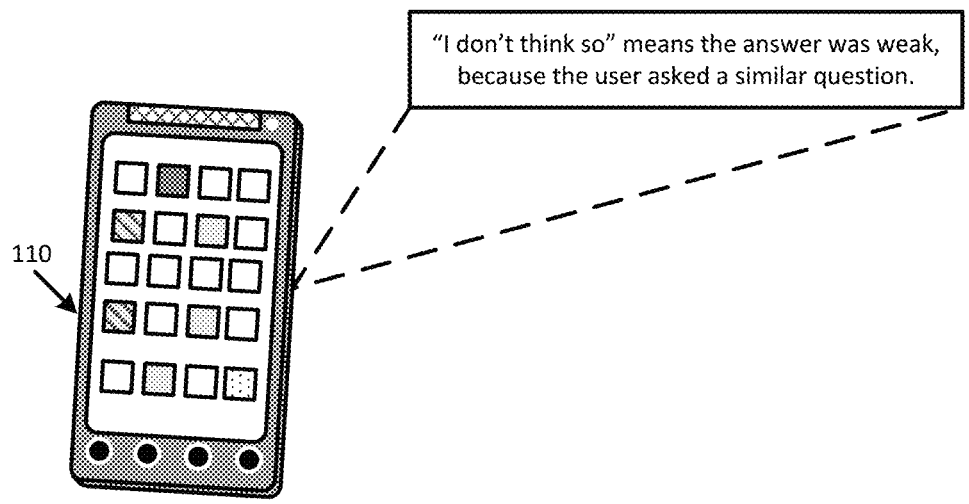

As shown in FIG. 12E, the user device 110 may store an indication that the feedback—specifically, the phrase "I don't think so," in this example—may identify that an answer is not relevant to an asked question. In other words, this indication may indicate that this feedback is provided by a user when an answer is not a strong answer. The user device 110 may store this indication based on the additional activity received from the user—specifically, the asking of the question "Who was the author of the Declaration of Independence?"—after the user device 110 has provided the answer "John Hancock." As described above with respect to process 1000, the user device 110 may use this indication to modify a feedback score associated with the feedback "I don't think so." For example, the user device 110 may lower a feedback score associated with the feedback "I don't think so."

Figure 13:
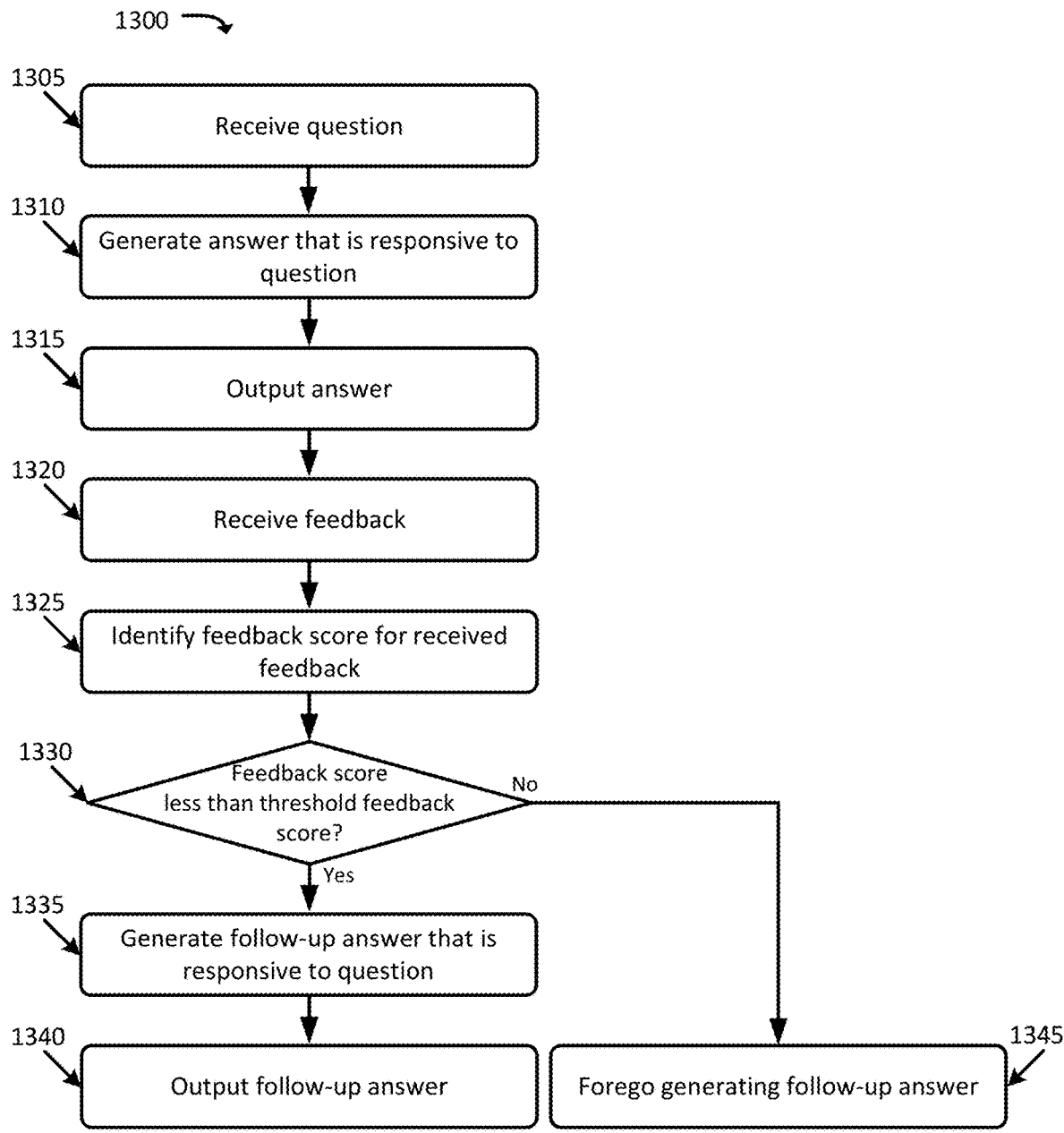
FIG. 13 illustrates a flowchart of an example process for providing a follow-up answer based on feedback, according to one or more implementations described herein.

FIG. 13 illustrates a flowchart of an example process 1300 for providing a follow-up answer based on feedback. In some implementations, process 1300 may be performed by a computer system comprising one or more computers, for example, the user device 305, and/or one or more of the servers 310-320 as shown in FIG. 3, and/or the dialog engine 500 as shown in FIG. 5. In some implementations, process 1300 may be performed by one or more other components instead of, or possibly in conjunction with, the user device 305, and/or one or more of the servers 310-320 as shown in FIG. 3, and/or the dialog engine 500 as shown in FIG. 5. However, for the sake of simplicity, process 1300 is described below as being performed by user device 305.

Process 1300 may include receiving a question (block 1305). In some implementations, receiving a question may include receiving a voice input that specifies the question. For example, as described above with respect to answer generation engine 505, user device 305 may receive a question, such as an audible question spoken by a user. Referring to the example scenario shown in FIG. 2A, user device 305 may receive the question "What was the highest grossing romantic comedy of 2003?"

Process 1300 may also include generating an answer that is responsive to the question (block 1310). For example, as described above with respect to the answer generation engine 505, the user device 305 may receive or generate an answer to the question received at block 1305. For example, as described above, the user device 305 may use information stored in the question-answer pair score repository server 310 and/or information received from the search engine server 320 when generating an answer at block 1310. As discussed above, the answer may be based on a score associated with a result received from the search engine server 320, a score associated with a question-answer pair received from question-answer pair score repository 520, or both. For example, the answer "Gigli" may be associated with a highest score out of scores associated with candidate answers.

Process 1300 may further include outputting, or providing, the answer (block 1315). For example, as described above with respect to the answer generation engine 505, the user device 305 may output the answer, generated at block 1310, via an audio output device, a visual output device, or any other technique of outputting information. Referring to the example scenario shown in FIG. 2B, user device 305 may output the answer "Gigli."

Process 1300 may additionally include receiving feedback (block 1320). In some implementations, receiving feedback may include receiving a voice input, and determining that the received voice input is classified as feedback to the answer of the question. For example, as described above with respect to the question-answer pair scoring engine 510, the user device 305 may receive feedback, such as audible feedback spoken by the user. Referring to the example scenario shown in FIG. 2C, user device 305 may receive the feedback "That can't be right."

Process 1300 may also include identifying a feedback score for the received feedback (block 1325). In some implementations, identifying a feedback score may include identifying a predetermined feedback score associated with the feedback. In some implementations, identifying a feedback score may include normalizing the feedback, identifying the predetermined feedback score based on the normalized feedback. For example, as described above with respect to question-answer pair scoring engine 510, user device 305 may receive or generate a feedback score for the feedback received at block 1320. Assume, for instance, that user device 305 identifies a feedback score of 0.0 for the feedback "That can't be right."

Process 1300 may further include determining whether the feedback score is less than a threshold feedback score (block 1330). For example, assume that the threshold feedback score is 0.2. Continuing with the above example, user device 305 may determine that the feedback score of 0.0, associated with the feedback "That can't be right," is less than the threshold feedback score. In some implementations, the system may determine the predetermined feedback score is lower than a threshold, and classify the feedback as negative feedback. In some implementations, the confidence score associated with the answer is adjusted lower based on classifying the feedback as negative feedback.

If the feedback score is less than the threshold feedback score (block 1330—YES), then process 1300 may include generating a follow-up answer that is responsive to the question (block 1335). In some implementations, after adjusting the confidence score associated with the answer, the system may identify a second answer to the question, wherein the second answer has a higher confidence score than the adjusted confidence score associated with the answer. For example, as described above with respect to the answer generation engine 505, the user device 305 may receive or generate a follow-up answer that is responsive to the question. For instance, as described above, the user device 305 may use information stored in the question-answer pair score repository server 310 and/or information received from the search engine server 320 when generating a follow-up answer at block 1335. As discussed above, the answer may be based on a score associated with a result received from the search engine server 320, a score associated with a question-answer pair received from the question-answer pair score repository 520, or both. For example, the answer generated at block 1335 may be associated with a score that is not the highest score out of scores associated with candidate answers—e.g., an answer that is associated with a second-highest score out of the scores associated with candidate answers.

For example, assume that the answer "Gigli," outputted at block 1315, is a highest scoring candidate answer. The user device 305 may identify that an answer "How to Lose a Guy in 10 Days" is a second-highest scoring candidate answer. The user device 305 may select the second-highest scoring candidate answer, and generate the follow-up answer based on the second-highest scoring candidate answer. Thus, the follow-up answer may include "How to Lose a Guy in 10 Days." In some implementations, the follow-up answer may further include an indication that the follow-up answer is a follow-up answer. In these implementations, the follow-up answer may be, for example, "How to Lose a Guy in 10 Days' may be a better answer," "Sorry about that, how about 'How to Lose a Guy in 10 Days,'" "Whoops, maybe 'How to Lose a Guy in 10 Days' is a better answer to your question," etc.

Process 1300 may further include outputting the follow-up answer (block 1340). In some implementations, outputting the follow-up answer may include providing, to a user device, the second answer. For example, as shown in FIG. 2E, the user device 305 may audibly output the phrase "How to Lose a Guy in 10 Days' may be a better answer." The user device 305 may audibly output the follow-up answer using text-to-speech or some other technique. Additionally, or alternatively, the user device 305 may output the follow-up answer visually by, for example, outputting the follow-up answer via a display device, such as a display screen associated with the user device 305.

If, on the other hand, the feedback score is not less than the threshold feedback score (block 1330—NO), then process 1300 may include foregoing generating a follow-up answer (block 1345). Such a scenario may occur, for example, when the user device 305 does not receive negative feedback regarding the answer outputted at block 1315, when the user device 305 does not receive any feedback regarding the answer outputted at block 1315, when the user device 305 receives positive feedback regarding the answer outputted at block 1315, etc.

In some implementations, user device 305 may wait for a particular duration of time to elapse, without receiving or detecting any additional activity from the user, before identifying the feedback score (at block 1325), determining whether the feedback score is less than the threshold feedback score (at block 1330), generating the follow-up answer (at block 1335), and/or outputting the follow-up answer (at block 1340). For example, user device 305 may wait 5 seconds, 10 seconds, one minute, or any duration of time, after receiving the feedback at 1320.

Assume, for instance, that the particular duration of time is 2 seconds. Further assume that the user device 305 receives (at block 1320) feedback, and then does not receive or detect any additional activity for 2 seconds after receiving the feedback. After the 2 seconds have elapsed, the user device 305 may output a follow-up answer (at block 1340).

In another scenario, assume still that the particular duration of time is 2 seconds. Further assume that the user device 305 receives (at block 1320) feedback, and then receives or detects additional activity 1 second after receiving the feedback. The user device 305 may process the additional activity in, for example, a manner described above with respect to FIG. 10. For example, the additional activity may be calling a telephone number associated with the answer, or sending an email to an email address associated with the answer. The user device 305 may, in some implementations, use the additional activity to generate or modify a feedback score associated with the feedback received at block 1320.

By waiting for the particular duration of time to elapse, the user device 305 of some implementations may provide the user with an opportunity to perform additional activity. Thus, in such implementations, the user may be more in control of the interaction between the user and the user device 305.

In some implementations, the duration of time may be configurable by a user, such as a user of user device 305, a user associated with one or more of servers 310-320, and/or any other user. In some implementations, the duration of time may be automatically determined or adjusted by user device 305, one or more of servers 310-320, and/or any other device. In some implementations, one user device 305 may be associated with one duration of time, while another user device 305 may be associated with a different duration of time.

In some implementations, user device 305 may not wait for any time to elapse before identifying the feedback score (at block 1325), determining whether the feedback score is less than the threshold feedback score (at block 1330), generating the follow-up answer (at block 1335), and/or outputting the follow-up answer (at block 1340). That is, upon receiving feedback (at block 1320), user device 305 of some implementations may identify the feedback score (at block 1325), determine whether the feedback score is less than the threshold feedback score (at block 1330), generate the follow-up answer (at block 1335), and/or output the follow-up answer (at block 1340).

While some of the above processes have been described separately, two or more of the above processes may be performed sequentially, iteratively, and/or in parallel, in some implementations. For instance, FIGS. 14A-14I illustrate an example of providing a follow-up answer and generating or modifying a question-answer pair score associated with a question and the follow-up answer.

Figure 14A:
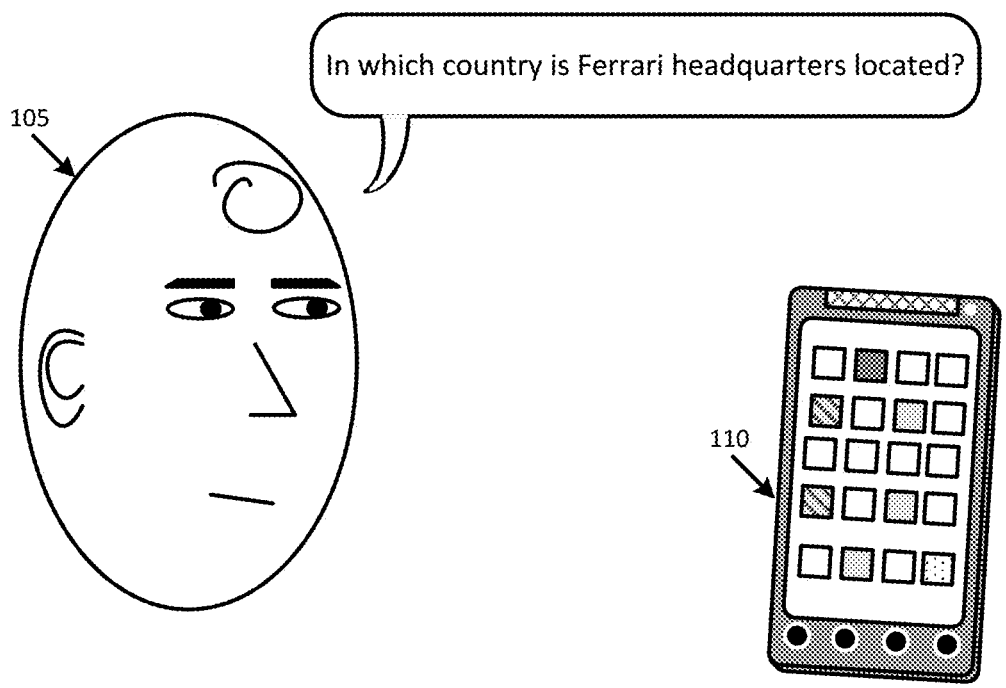
FIGS. 14A-14I illustrate an example of providing a follow-up answer and generating or modifying a question-answer pair score associated with a question and the follow-up answer, according to one or more implementations described herein.
Figure 14B:
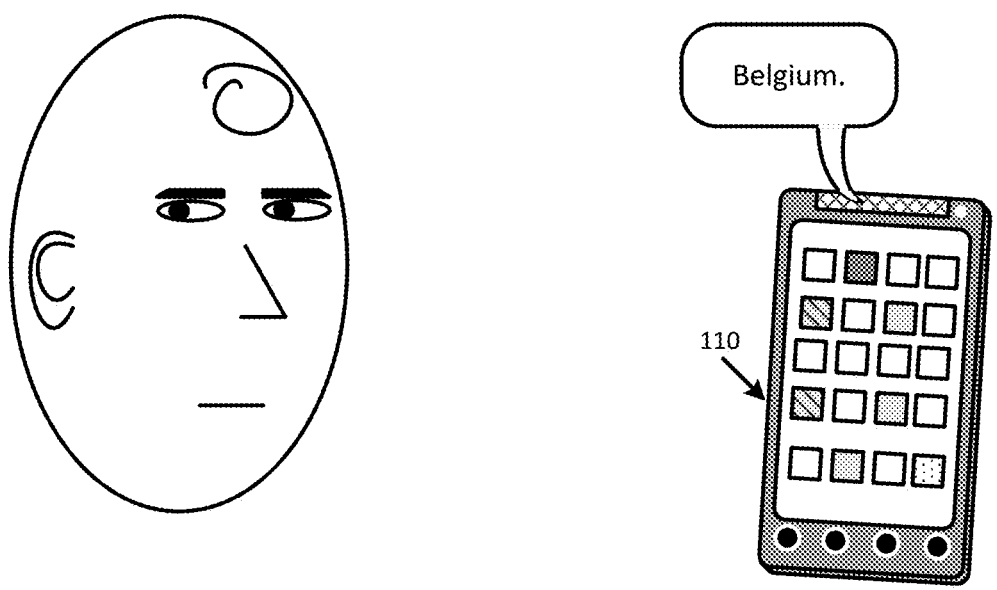
Figure 14C:
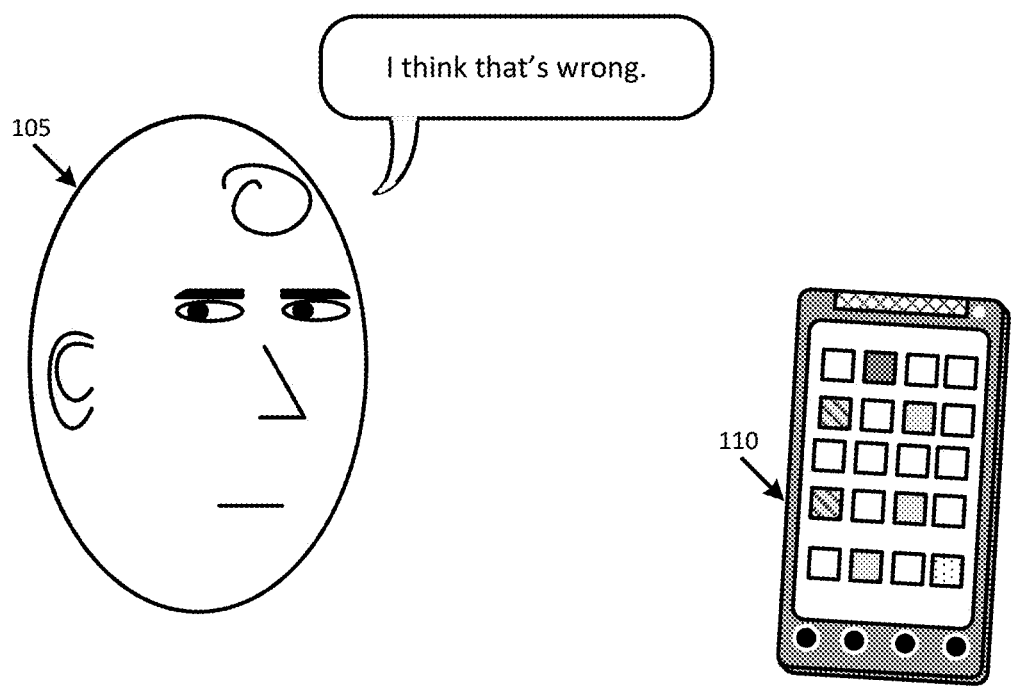
Figure 14D:
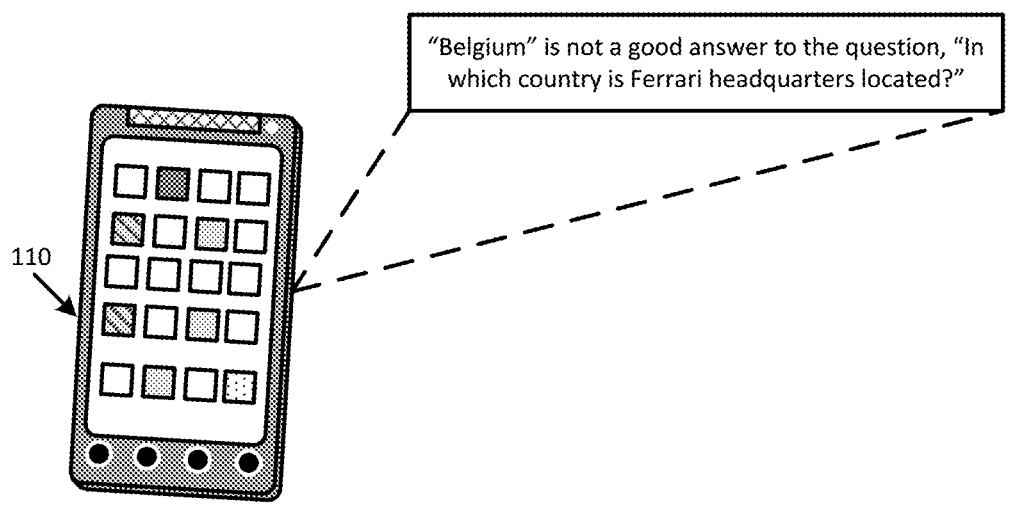

As shown in FIG. 14A, a user 105 may ask a question to a user device 110. For example, the user 105 may ask the question "In which country is Ferrari headquarters located?" As shown in FIG. 14B, the user device 110 may output an answer, such as "Belgium." As shown in FIG. 14C, the user 105 may provide feedback, such as "I think that's wrong." The user device 110 may identify a feedback score associated with the feedback "I think that's wrong." Based on the feedback score, and as shown in FIG. 14D, the user device 110 may determine that "Belgium" is not a strong answer to the question "In which country is Ferrari headquarters located?" Based on determining that "Belgium" is not a strong answer to the question, the user device 110 may cause a question-answer pair score, associated with the question "In which country is Ferrari headquarters located?" and the answer "Belgium" to be adjusted to reflect that "Belgium" is not a strong answer to the question.

Figure 14E:
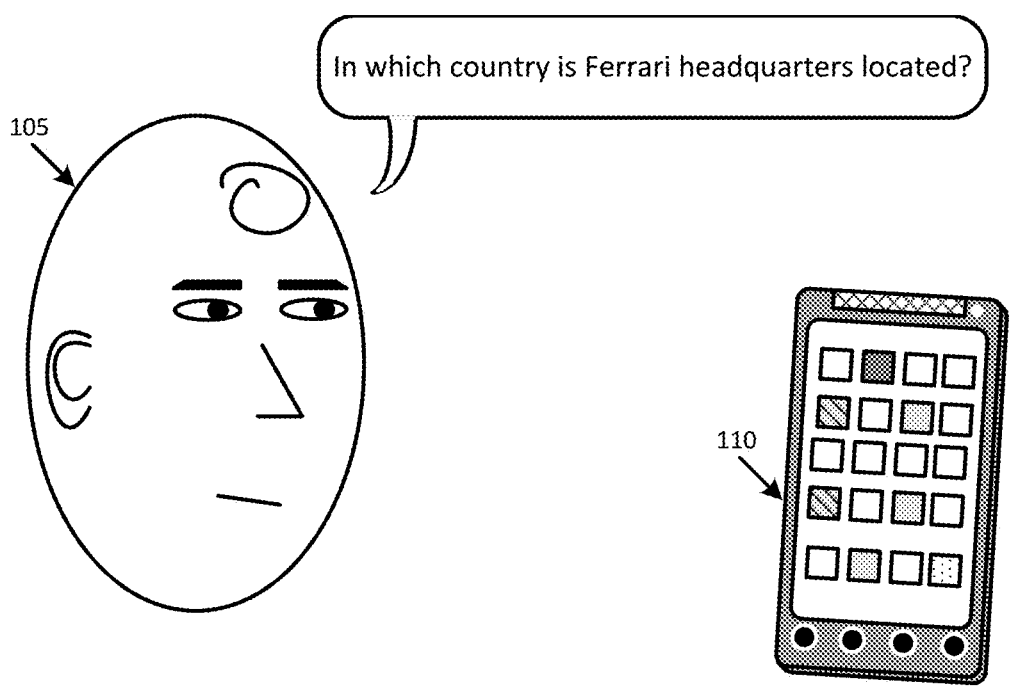

As shown in FIG. 14E, the user device 110 may detect additional activity from the user 105, such as the user 105 asking the question "In which country is Ferrari headquarters located?" As mentioned above, the user device 110 may wait for a particular duration of time to elapse before automatically providing a follow-up answer, when a user's feedback indicates the user's dissatisfaction with an answer. In the example shown in FIG. 14E, the user device 110 may detect the additional activity—i.e., the user repeating the question "In which country is Ferrari headquarters located?"—before the particular duration of time has elapsed.

Figure 14F:
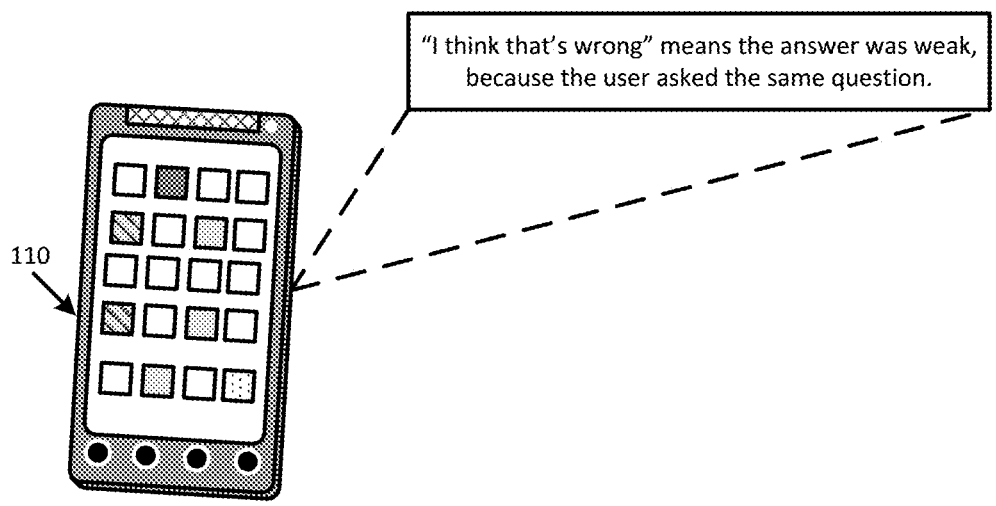

As shown in FIG. 14F, the user device 110 may store an indication that the feedback—specifically, the phrase "I think that's wrong," in this example—may identify that an answer is not relevant to an asked question. In other words, this indication may indicate that this feedback is provided by a user when an answer is not a strong answer. The user device 110 may store this indication based on the additional activity received from the user—specifically, the repetition of the question "In which country is Ferrari headquarters located?"—after the user device 110 has provided the answer "Belgium." As described above with respect to process 1000, the user device 110 may use this indication to modify a feedback score associated with the feedback "I think that's wrong." For example, the user device 110 may lower a feedback score associated with the feedback "I think that's wrong."

Figure 14G:
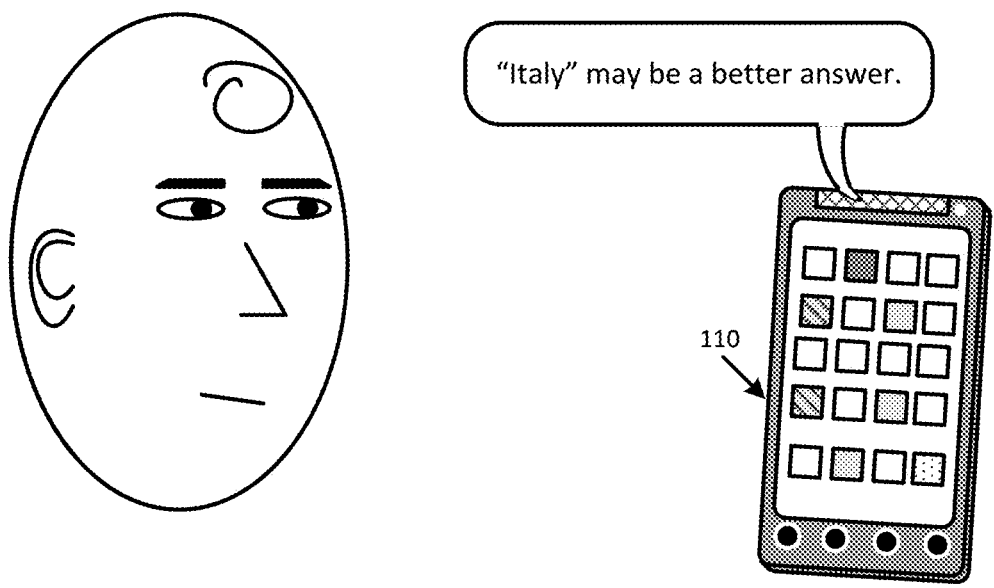

The user device 110 may determine that the additional activity is related to the question asked in FIG. 14A based on, for example, a measure of similarity—e.g., semantic similarity—of the additional activity to the question asked in FIG. 14A. Based on determining that the additional activity is related to the question asked in FIG. 14A, and as shown in FIG. 14G, the user device 110 may output the follow-up answer "Italy' may be a better answer," in response to the additional activity—namely, the repetition of the question "In which country is Ferrari headquarters located?" That is, since the user device 110 has determined that the additional activity is related to the question asked in FIG. 14A, the user device 110 may include an indication—e.g., the phrase "may be a better answer"—that the answer outputted at FIG. 14G is a follow-up answer.

Figure 14H:
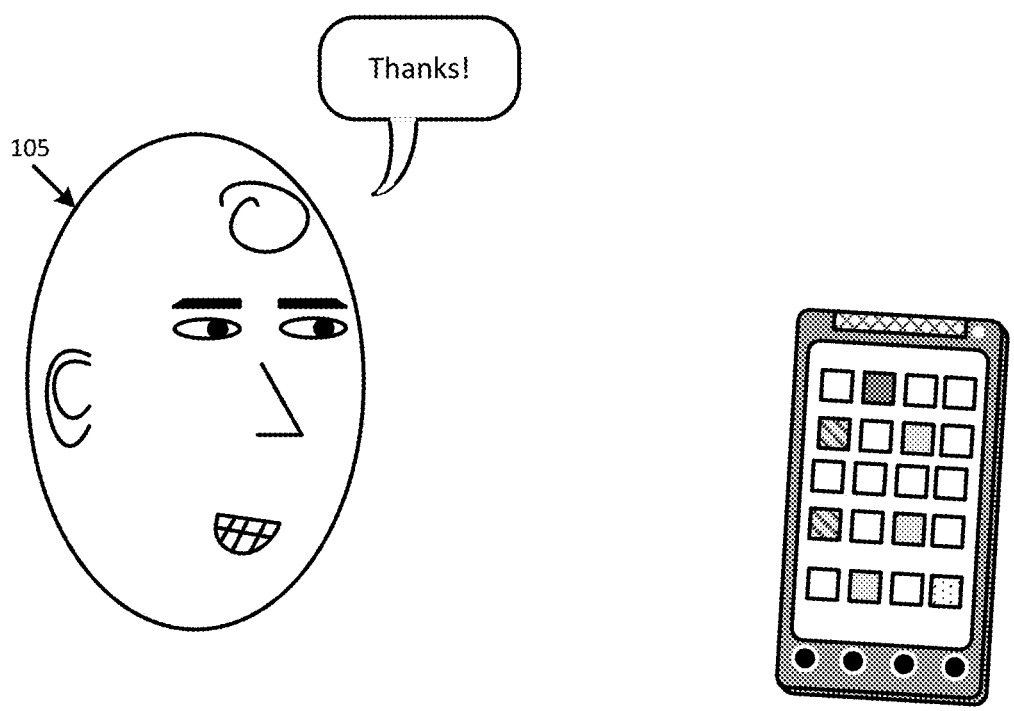
Figure 14I:
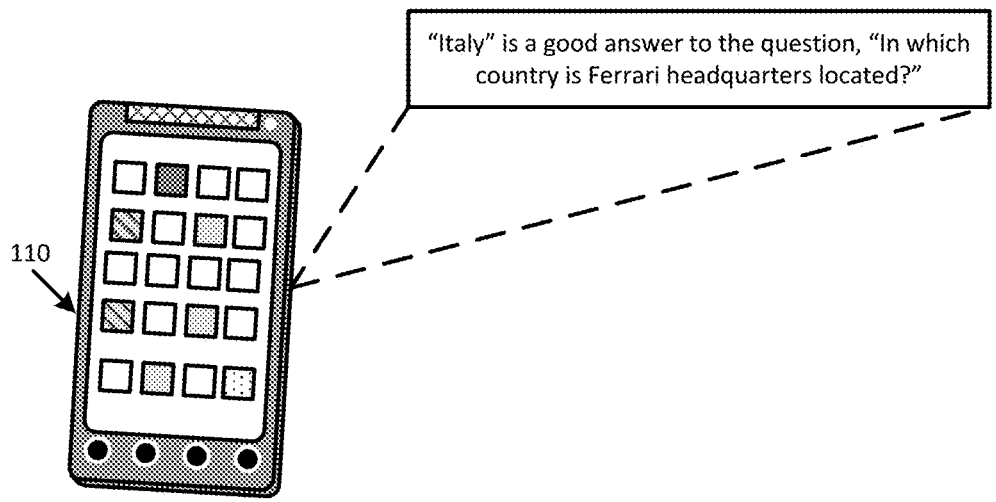

As shown in FIG. 14H, the user 105 may provide feedback regarding the follow-up answer. Specifically, for instance, the user 105 may speak the word "Thanks." The user device 110 may identify a feedback score associated with the feedback "Thanks." Based on the feedback score, and as shown in FIG. 14I, the user device 110 may determine that "Italy" is a strong answer to the question "In which country is Ferrari headquarters located?" Based on determining that "Italy" is a strong answer to the question, the user device 110 may cause a question-answer pair score, associated with the question "In which country is Ferrari headquarters located?" and the answer "Italy" to be adjusted to reflect that "Italy" is a strong answer to the question.

Some implementations, described herein, may allow one or more devices to generate or modify question-answer pair scores based on user feedback, such as feedback that a user provides after the user device outputs an answer that responds to the user's question. Additionally, some implementations may allow one or more devices to automatically provide follow-up answers when a user's feedback indicates that the user is dissatisfied with an answer. Furthermore, some implementations, described herein, may allow one or more devices to generate or modify feedback scores that indicate whether feedback, provided by users, is associated with users' satisfaction, dissatisfaction, or ambivalence with respect to answers provided in response to questions asked by the users, based on additional user activity after users provide feedback.

The foregoing description provides illustration and description, but is not intended to be exhaustive or to limit the implementations to the precise form disclosed. Modifications and variations are possible in light of the above description or may be acquired from practice of the implementations.

For example, while feedback was described in the context of words that may be spoken by a user, other type of feedback may be used to score question-answer pairs. For example, a user's facial expressions may be used in addition to, or in lieu of, words spoken by the user in order to determine user feedback. A video input device, such as a camera, associated with user device 305 may capture one or more images of the face of the user, and may identify feedback based on the captured one or more images of the face of the user. For example, user device 305 may compare positions and/or angles of the user's facial features to stored information, of positions and/or angles of facial features, that is associated with user feedback. One or more devices, e.g., feedback score repository server 315, may store information associating positions and/or angles of facial features with feedback and/or feedback scores.

Additionally, or alternatively, audible characteristics of the user's voice may be identified as feedback. For instance, volume of a user's voice, inflection of a user's voice, or other characteristics of the voice of the user may be used in order to identify feedback. For example, information, e.g., information stored by feedback score repository server 315, may associate vocal characteristics with feedback and/or feedback scores.

Furthermore, while series of blocks have been described with regard to FIGS. 8-10, the order of the blocks may be modified in other implementations. Further, non-dependent blocks may be performed in parallel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at data processing hardware of a mobile device, a voice query from a user;
providing, by the data processing hardware, a first answer to the voice query for output using a speaker of the mobile device, the first answer corresponding to a candidate answer from a set of multiple candidate answers for the voice query;
receiving, at the data processing hardware, feedback from the user indicating satisfaction or dissatisfaction with the provided first answer to the voice query; and
when the feedback indicates dissatisfaction with the provided first answer, providing, by the data processing hardware, without receiving or detecting any additional activity from the user after receiving the feedback from the user, a second answer to the voice query for output using the speaker of the mobile device, the second answer different than the first answer.

2. The method of claim 1, wherein each candidate answer from the set of multiple candidate answers for the voice query has an associated confidence score that indicates an estimation of relevance of the candidate answer to the voice query.

3. The method of claim 2, wherein the first answer corresponds to the candidate answer associated with the highest confidence score out of the confidence scores associated with the set of multiple candidate answers for the voice query.

4. The method of claim 2, wherein the second answer corresponds to the candidate answer associated with the second highest confidence score out of the confidence scores associated with the set of multiple candidate answers for the voice query.

5. The method of claim 2, further comprising, when the feedback indicates dissatisfaction with the provided first answer, updating, by data processing hardware, the confidence score associated with the candidate answer corresponding to the first answer.

6. The method of claim 1, wherein receiving feedback from the user comprises receiving a voice utterance detected by the mobile device that is uttered by the user.

7. The method of claim 1, wherein receiving feedback from the user comprises:
receiving one or more images of a face of the user detected by a video input device associated with the mobile device; and
identifying the feedback based on the captured one or more images of the face of the user.

8. The method of claim 1, further comprising, prior to providing the second answer to the voice query, determining, by the data processing hardware, that the feedback was received within a predetermined amount of time of providing the first answer for output using the speaker of the mobile device.

9. The method of claim 1, wherein receiving the feedback from the user indicating satisfaction or dissatisfaction with the provided first answer to the voice query comprises identifying an action performed by the user after providing the first answer for output using the speaker of the mobile device.

10. The method of claim 1, further comprising storing, by the data processing hardware, multiple predefined queries that each correspond to a particular candidate answer.

11. A mobile device comprising:
data processing hardware; and
memory hardware in communication with the data processing hardware and storing instructions that when executed on the data processing hardware cause the data processing hardware to perform operations comprising:
receiving a voice query from a user associated with the mobile device;
providing a first answer to the voice query for output using a speaker of the mobile device, the first answer corresponding to a candidate answer from a set of multiple candidate answers for the voice query;
receiving feedback from the user indicating satisfaction or dissatisfaction with the provided first answer to the voice query; and
when the feedback indicates dissatisfaction with the provided first answer, providing, without receiving or detecting any additional activity from the user after receiving the feedback from the user, a second answer to the voice query for output using the speaker of the mobile device, the second answer different than the first answer.

12. The mobile device of claim 11, wherein each candidate answer from the set of multiple candidate answers for the voice query has an associated confidence score that indicates an estimation of relevance of the candidate answer to the voice query.

13. The mobile of claim 12, wherein the first answer corresponds to the candidate answer associated with the highest confidence score out of the confidence scores associated with the set of multiple candidate answers for the voice query.

14. The mobile device of claim 12, wherein the second answer corresponds to the candidate answer associated with the second highest confidence score out of the confidence scores associated with the set of multiple candidate answers for the voice query.

15. The mobile device of claim 12, wherein the operations further comprise, when the feedback indicates dissatisfaction with the provided first answer, updating the confidence score associated with the candidate answer corresponding to the first answer.

16. The mobile device of claim 11, wherein receiving feedback from the user comprises receiving a voice utterance detected by the mobile device that is uttered by the user.

17. The mobile device of claim 11, wherein receiving feedback from the user comprises:
receiving one or more images of a face of the user detected by a video input device associated with the mobile device; and
identifying the feedback based on the captured one or more images of the face of the user.

18. The mobile device of claim 11, wherein the operations further comprise, prior to providing the second answer to the voice query, determining that the feedback was received within a predetermined amount of time of providing the first answer for output using the speaker of the mobile device.

19. The mobile device of claim 11, wherein receiving the feedback from the user indicating satisfaction or dissatisfaction with the provided first answer to the voice query comprises identifying an action performed by the user after providing the first answer for output using the speaker of the mobile device.

20. The mobile device of claim 11, wherein the operations further comprise storing multiple predefined queries that each correspond to a particular candidate answer.

* * * * *